(12) United States Patent
Khoche

(10) Patent No.: US 12,242,912 B2
(45) Date of Patent: Mar. 4, 2025

(54) HIERARCHICAL COMBINATION OF DISTRIBUTED STATISTICS IN A MONITORING NETWORK

(71) Applicant: Trackonomy Systems, Inc., San Jose, CA (US)

(72) Inventor: Ajay Khoche, West San Jose, CA (US)

( * ) Notice: Subject to any disclaimer, the term of this patent is extended or adjusted under 35 U.S.C. 154(b) by 0 days.

(21) Appl. No.: 18/236,797

(22) Filed: Aug. 22, 2023

(65) Prior Publication Data

US 2024/0135134 A1 Apr. 25, 2024
US 2024/0232567 A9 Jul. 11, 2024

Related U.S. Application Data

(63) Continuation of application No. 17/467,246, filed on Sep. 5, 2021, now Pat. No. 11,775,797, which is a
(Continued)

(51) Int. Cl.
| | |
|---|---|
| *G06K 19/077* | (2006.01) |
| *B32B 37/06* | (2006.01) |
| *B32B 37/12* | (2006.01) |
| *C09J 7/38* | (2018.01) |
| *G06K 19/06* | (2006.01) |

(Continued)

(52) U.S. Cl.
CPC ........ *G06K 19/07773* (2013.01); *B32B 37/06* (2013.01); *B32B 37/12* (2013.01); *C09J 7/38* (2018.01); *G06K 19/06037* (2013.01); *G06K 19/0702* (2013.01); *H04W 4/029* (2018.02); *B32B 2457/00* (2013.01); *C09J 2203/326* (2013.01); *C09J 2301/124* (2020.08); *C09J 2301/302* (2020.08); *C09J 2301/40* (2020.08); *C09J 2463/00* (2013.01); *H04W 4/027* (2013.01)

(58) Field of Classification Search
CPC ....... G06K 19/07773; G06K 19/06037; G06K 19/0702; B32B 37/06; B32B 37/12; B32B 2457/00; C09J 7/38; C09J 2203/326; C09J 2301/124; C09J 2301/302; C09J 2301/40; C09J 2463/00; H04W 4/029; H04W 4/027
See application file for complete search history.

(56) References Cited

U.S. PATENT DOCUMENTS

2008/0151801 A1 6/2008 Mizuta
2016/0337878 A1\* 11/2016 Frederiksen .......... H04W 72/20

OTHER PUBLICATIONS

Written Opinion for Singapore Patent Application No. 11202100599V, dated Mar. 15, 2024. 5 pages.

\* cited by examiner

*Primary Examiner* — Seung H Lee

(57) ABSTRACT

Methods, systems, and computer program products for creating a monitoring network are described. A server associates a master wireless node with a package in a first set of associated packages. The server and the master wireless node communicate with one another over first type of wireless communications interface. The server also associates a peripheral wireless node with another package in the set and with the master node. The peripheral wireless node and the master wireless node communicate with one another over a second type of wireless communications interface. The peripheral node includes a sensor operative to generate sensor data by sensing an environmental condition. The master wireless node processes the sensor data to generate one or more package-level statistics of the processed sensor data.

20 Claims, 8 Drawing Sheets

Related U.S. Application Data continuation of application No. 16/517,508, filed on Jul. 19, 2019, now Pat. No. 11,138,490, and a continuation-in-part of application No. 16/383,353, filed on Apr. 12, 2019, now Pat. No. 10,872,286, which is a continuation of application No. 15/842,861, filed on Dec. 14, 2017, now Pat. No. 10,262,255, said application No. 16/517,508 is a continuation-in-part of application No. 15/842,840, filed on Dec. 14, 2017, now Pat. No. 10,482,369, said application No. 16/517,508 is a continuation-in-part of application No. 16/409,589, filed on May 10, 2019, now Pat. No. 10,902,310, said application No. 16/517,508 is a continuation-in-part of application No. 16/430,929, filed on Jun. 4, 2019, now Pat. No. 10,885,420.

(60) Provisional application No. 62/701,608, filed on Jul. 20, 2018, provisional application No. 62/680,716, filed on Jun. 5, 2018, provisional application No. 62/670,712, filed on May 11, 2018, provisional application No. 62/435,207, filed on Dec. 16, 2016, provisional application No. 62/434,218, filed on Dec. 14, 2016.

(51) Int. Cl.
*G06K 19/07* (2006.01)
*H04W 4/029* (2018.01)
*H04W 4/02* (2018.01)

US 12,242,912 B2

HIERARCHICAL COMBINATION OF DISTRIBUTED STATISTICS IN A MONITORING NETWORK

CROSS-REFERENCE TO RELATED APPLICATIONS

This application is a continuation of U.S. patent application Ser. No. 17/467,246. U.S. patent application Ser. No. 17/467,246 is a continuation of U.S. patent application Ser. No. 16/517,508, now U.S. Pat. No. 11,138,490, which claims priority to U.S. Provisional Application No. 62/701,608, filed Jul. 20, 2018 and is a continuation in part of U.S. patent application Ser. No. 16/383,353, filed Apr. 12, 2019, now U.S. Pat. No. 10,872,286, which itself is a continuation of U.S. patent application Ser. No. 15/842,861, filed Dec. 14, 2017, now U.S. Pat. No. 10,262,255, which claims priority to U.S. Provisional Patent Application No. 62/434,218, filed on Dec. 14, 2016, and claims priority to U.S., Provisional Patent Application No. 62/435,207, filed on Dec. 16, 2016. U.S. patent application Ser. No. 16/517,508 is also a continuation in part of U.S. patent application Ser. No. 15/842,867, filed Dec. 14, 2017, now U.S. Pat. No. 10,445,634, which claims priority to U.S. Provisional Patent Application No. 62/434,218, filed on Dec. 14, 2016, and claims priority to U.S., Provisional Patent Application No. 62/435,207, filed on Dec. 16, 2016. U.S. patent application Ser. No. 16/517,508 is also a continuation in part of U.S. patent application Ser. No. 15/842,840 filed on Dec. 14, 2017, now U.S. Pat. No. 10,482,369, which claims priority to U.S. Provisional Patent Application No. 62/434,218, filed on Dec. 14, 2016, and claims priority to U.S., Provisional Patent Application No. 62/435,207, filed on Dec. 16, 2016. U.S. patent application Ser. No. 16/517,508 is also a continuation in part of U.S. patent application Ser. No. 16/409,589, filed on May 10, 2019, now U.S. Pat. No. 10,902,310, which claims priority to U.S. Provisional Patent Application No. 62/670,712, filed May 11, 2018. U.S. patent application Ser. No. 16/517,508 is also a continuation in part of U.S. patent application Ser. No. 16/430,929, filed on Jun. 4, 2019, now U.S. Pat. No. 10,885,420, which claims priority to U.S. Provisional Patent Application No. 62/680,716, filed Jun. 5, 2018. All of the above-referenced applications are incorporated herein, in their entirety.

FIELD OF THE DISCLOSURE

The disclosure generally relates to logistics and more particularly to asset management, including packaging, tracking, warehousing, inventorying, and monitoring items (e.g., objects, parcels, persons, tools and other equipment).

SUMMARY

This specification describes a low-cost, multi-function wireless tape system with a form factor that unobtrusively integrates the components needed to implement a combination of different logistic functions and also is able to perform a useful ancillary function that otherwise would have to be performed with the attendant need for additional materials, labor, and expense.

In an aspect, the wireless tape system is implemented as a collection of adhesive products that integrate wireless communications and sensing components within a flexible adhesive structure in a way that not only provides a cost-effective platform for interconnecting, optimizing, and protecting the components of the tracking system but also maintains the flexibility needed to function as an adhesive product that can be deployed seamlessly and unobtrusively into various logistic applications and workflows, including person and object tracking applications, and asset management workflows such as manufacturing, storage, shipping, delivery, and other logistics associated with moving products and other physical objects, including logistics, sensing, tracking, locationing, warehousing, parking, safety, construction, event detection, road management and infrastructure, security, and healthcare. In some examples, the flexible adhesive tape platforms are used in various aspects of logistics management, including sealing packages, transporting packages, tracking packages, monitoring the conditions of packages, inventorying packages, and verifying package security. In these examples, the sealed packages typically are transported from one location to another by truck, train, ship, or aircraft.

Embodiments of the subject matter described in this specification include methods, processes, systems, apparatus, and tangible non-transitory carrier media encoded with one or more program instructions for carrying out one or more methods and processes for enabling the various functionalities of the described systems and apparatus.

Other features, aspects, objects, and advantages of the subject matter described in this specification will become apparent from the description, the drawings, and the claims.

DETAILED DESCRIPTION

Figure 1A:
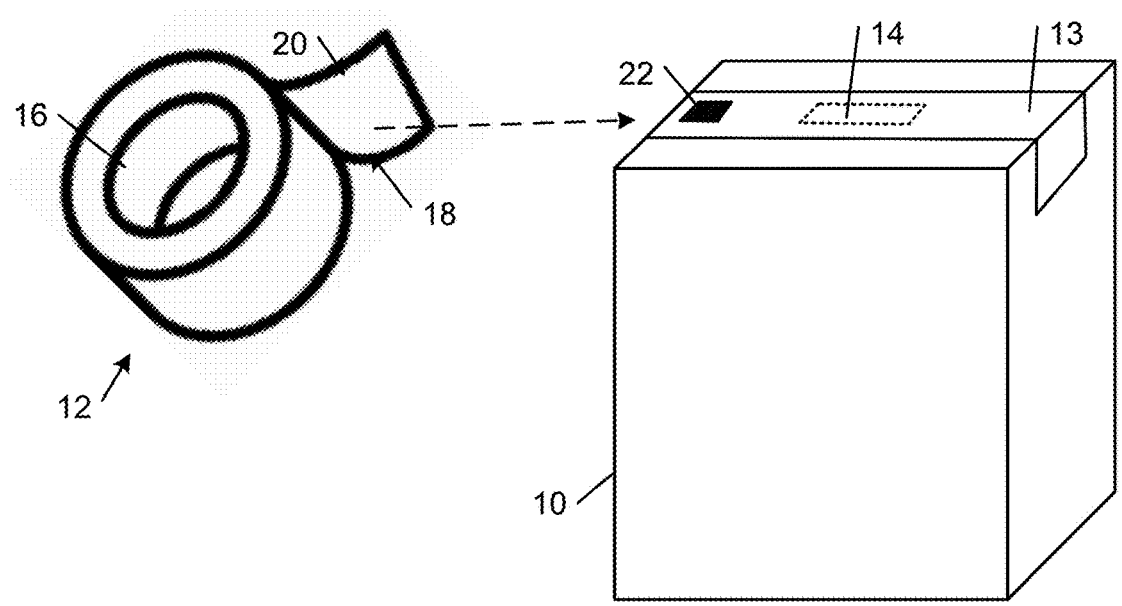
FIG. 1A is a diagrammatic view of a package that has been sealed for shipment using a segment of an example adhesive tape platform dispensed from a roll.

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

As used herein, the term "or" refers an inclusive "or" rather than an exclusive "or." In addition, the articles "a" and "an" as used in the specification and claims mean "one or more" unless specified otherwise or clear from the context to refer the singular form.

As used herein, the term "tape node" refers to a segment of an adhesive product that is equipped with wireless communications functionality, where the adhesive product have a variety of different form factors, including a multi-layer roll or a sheet that includes a plurality of divisible adhesive segments. Once deployed, each tape node can function, for example, as an adhesive tape, label, sticker, decal, or the like, and as a wireless communications device.

As used herein, the term parcel refers to an item to be shipped, where the item may have a variety of different form factors, including a package, an envelope, a box, a container, a pallet, a carton, and the like.

In the instant specification, an adhesive tape platform is described that includes a plurality of segments that can be separated from the adhesive product (e.g., by cutting, tearing, peeling, or the like) and adhesively attached to a variety of different surfaces to inconspicuously implement any of a wide variety of different wireless communications based network communications and transducing (e.g., sensing, actuating, etc.) applications. Examples of such applications include: event detection applications, monitoring applications, security applications, notification applications, and tracking applications, including inventory tracking, package tracking, person tracking, animal (e.g., pet) tracking, manufactured parts tracking, and vehicle tracking. In example embodiments, each segment of an adhesive tape platform is equipped with an energy source, wireless communication functionality, transducing functionality, and processing functionality that enable the segment to perform one or more transducing functions and report the results to a remote server or other computer system. The components of the adhesive tape platform are encapsulated within a flexible adhesive structure that protects the components from damage while maintaining the flexibility needed to function as an adhesive tape (e.g., duct tape or a label) for use in various applications and workflows. In addition to single function applications, example embodiments also include multiple transducers (e.g., sensing and/or actuating transducers) that extend the utility of the platform by, for example, providing supplemental information regarding characteristics of the state and or environment of, for example, an article, object, vehicle, or person, over time.

The instant specification also describes systems and processes for fabricating flexible multifunction adhesive tape platforms in efficient and low-cost ways. In addition to using roll-to-roll and/or sheet-to-sheet manufacturing techniques, the fabrication systems and processes are configured to optimize the placement and integration of components within the flexible adhesive structure to achieve high flexibility and ruggedness. These fabrication systems and processes are able to create useful and reliable adhesive tape platforms that can provide local sensing, wireless transmitting, and locationing functionalities. Such functionality together with the low cost of production is expected to encourage the ubiquitous deployment of adhesive tape platform segments and thereby alleviate at least some of the problems arising from gaps in conventional infrastructure coverage that prevent continuous monitoring, event detection, security, tracking, and other logistics applications across heterogeneous environments.

FIG. 1A shows an example package 10 that is sealed for shipment using an example adhesive tape platform 12 that includes embedded components of a wireless transducing circuit 14 (collectively referred to herein as a "tape node"). In this example, a length 13 of the adhesive tape platform 12 is dispensed from a roll 16 and affixed to the package 10. The adhesive tape platform 12 includes an adhesive side 18 and a non-adhesive side 20. The adhesive tape platform 12 can be dispensed from the roll 16 in the same way as any conventional packing tape, shipping tape, or duct tape. For example, the adhesive tape platform 12 may be dispensed from the roll 16 by hand, laid across the seam where the two top flaps of the package 10 meet, and cut to a suitable length either by hand or using a cutting instrument (e.g., scissors or an automated or manual tape dispenser). Examples of such tapes include tapes having non-adhesive sides 20 that carry one or more coatings or layers (e.g., colored, light reflective, light absorbing, and/or light emitting coatings or layers).

Figure 1B:
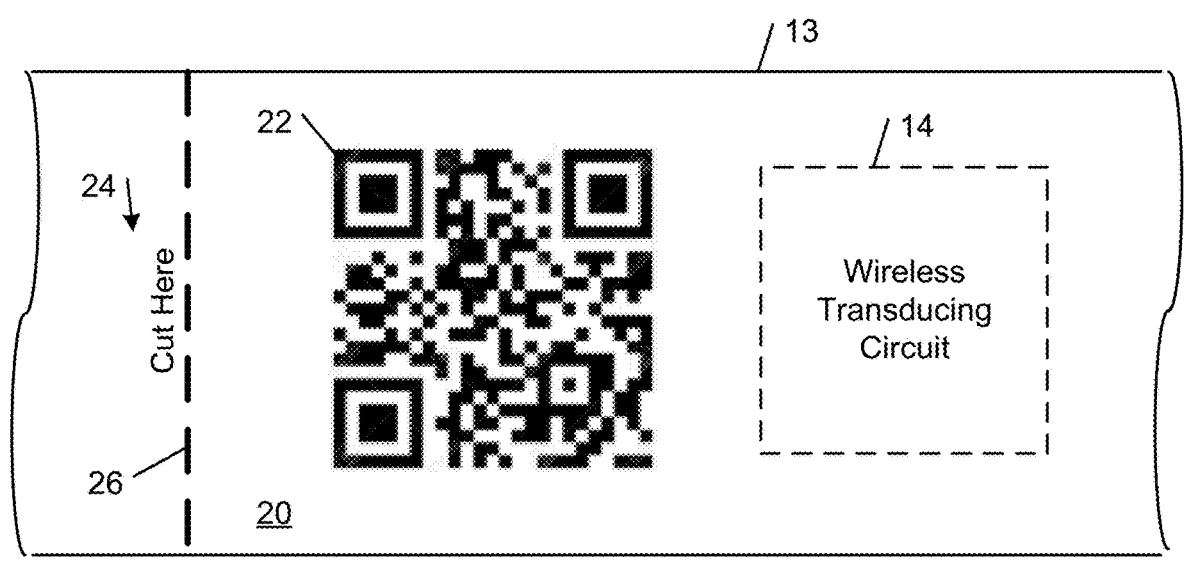
FIG. 1B is a diagrammatic top view of a portion of the segment of the example adhesive tape platform shown in FIG. 1A.

Referring to FIG. 1B, in some examples, the non-adhesive side 20 of the length 13 of the adhesive tape platform 12 includes writing or other markings that convey instructions, warnings, or other information to a person or machine (e.g., a bar code reader), or may simply be decorative and/or entertaining. For example, different types of adhesive tape platforms may be marked with distinctive colorations to distinguish one type of adhesive tape platform from another. In the illustrated example, the length 13 of the adhesive tape platform 12 includes a two-dimensional bar code 22, written instructions 24 (i.e., "Cut Here"), and an associated cut line 26 that indicates where the user should cut the adhesive tape platform 12. The written instructions 24 and the cut line 26 typically are printed or otherwise marked on the top non-adhesive surface 20 of the adhesive tape platform 12 during manufacture. The two-dimensional bar code 22, on the other hand, may be marked on the non-adhesive surface 20 of the adhesive tape platform 12 during the manufacture of the adhesive product 12 or, alternatively, may be marked on the non-adhesive surface 20 of the adhesive tape platform 12 as needed using, for example, a printer or other marking device.

In order to avoid damage to the functionality of the segments of the adhesive tape platform 12, the cut lines 26 typically demarcate the boundaries between adjacent segments at locations that are free of any components of the wireless transducing circuit 14. The spacing between the wireless transducing circuit components 14 and the cut lines 26 may vary depending on the intended communication, transducing and/or adhesive taping application. In the example illustrated in FIG. 1A, the length of the adhesive tape platform 12 that is dispensed to seal the package 10 corresponds to a single segment of the adhesive tape platform 12. In other examples, the length of the adhesive tape platform 12 needed to seal a package or otherwise serve the adhesive function for which the adhesive tape platform 12 is being applied may include multiple segments 13 of the adhesive tape platform 12, one or more of which segments 13 may be activated upon cutting the length of the adhesive tape platform 12 from the roll 16 and/or otherwise applying the length of the adhesive tape platform to the package 10.

In some examples, the transducing components 14 that are embedded in one or more segments 13 of the adhesive tape platform 12 are activated when the adhesive tape platform 12 is cut along the cut line 26. In these examples, the adhesive tape platform 12 includes one or more embedded energy sources (e.g., thin film batteries, which may be printed, or conventional cell batteries, such as conventional watch style batteries, rechargeable batteries, or other energy storage device, such as a super capacitor or charge pump) that supply power to the transducing components 14 in one or more segments of the adhesive tape platform 12 in response to being separated from the adhesive tape platform 12 (e.g., along the cut line 26).

In some examples, each segment 13 of the adhesive tape platform 12 includes its own respective energy source. In some of these examples, each energy source is configured to only supply power to the components in its respective adhesive tape platform segment regardless of the number of contiguous segments 13 that are in a given length of the adhesive tape platform 12. In other examples, when a given length of the adhesive tape platform 12 includes multiple segments 13, the energy sources in the respective segments 13 are configured to supply power to the transducing components 14 in all of the segments 13 in the given length of the adhesive tape platform 12. In some of these examples, the energy sources are connected in parallel and concurrently activated to power the transducing components 14 in all of the segments 13 at the same time. In other examples, the energy sources are connected in parallel and alternately activated to power the transducing components 14 in respective ones of the adhesive tape platform segments 13 at different time periods, which may or may not overlap.

Figure 2:
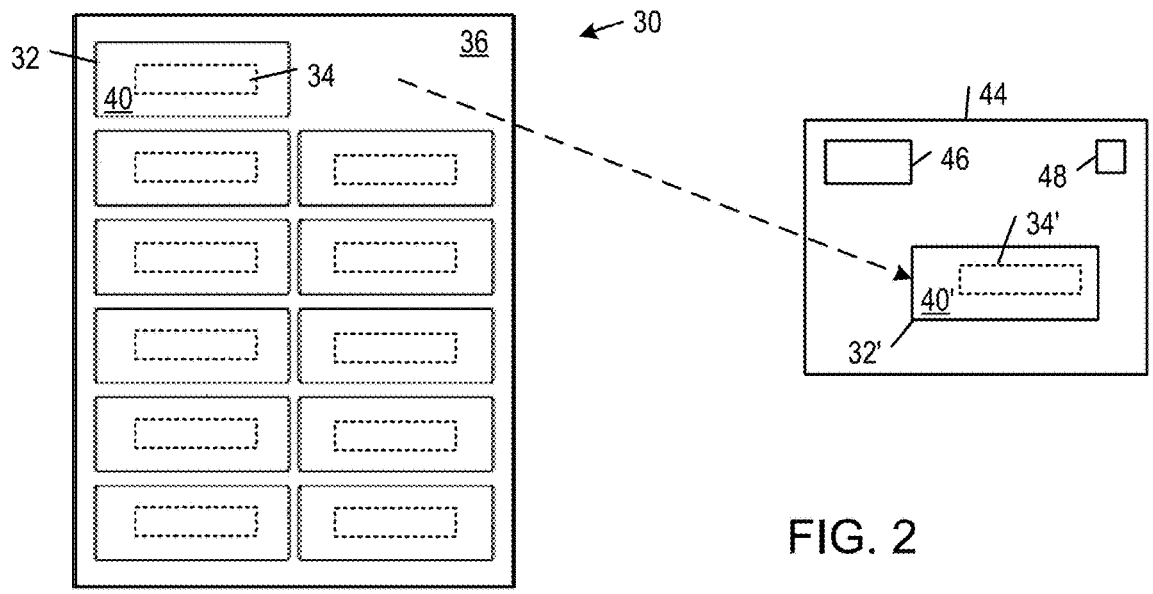
FIG. 2 is a diagrammatic view of an example of an envelope carrying a segment of an example adhesive tape platform dispensed from a backing sheet.

FIG. 2 shows an example adhesive tape platform 30 that includes a set of adhesive tape platform segments 32 each of which includes a respective set of embedded wireless transducing circuit components 34, and a backing sheet 36 with a release coating that prevents the adhesive segments 32 from adhering strongly to the backing sheet 36. Each adhesive tape platform segment 32 includes an adhesive side facing the backing sheet 36, and an opposing non-adhesive side 40. In this example, a particular segment 32' of the adhesive tape platform 30 has been removed from the backing sheet 36 and affixed to an envelope 44. Each segment 32 of the adhesive tape platform 30 can be removed from the backing sheet 36 in the same way that adhesive labels can be removed from a conventional sheet of adhesive labels (e.g., by manually peeling a segment 32 from the backing sheet 36). In general, the non-adhesive side 40' of the segment 32' may include any type of writing, markings, decorative designs, or other ornamentation. In the illustrated example, the non-adhesive side 40' of the segment 32' includes writing or other markings that correspond to a destination address for the envelope 44. The envelope 44 also includes a return address 46 and, optionally, a postage stamp or mark 48.

In some examples, the wireless transducing circuit components 34 that are embedded in a segment 32 of the adhesive tape platform 12 are activated when the segment 32 is removed from the backing sheet 32. In some of these examples, each segment 32 includes an embedded capacitive sensing system that can sense a change in capacitance when the segment 32 is removed from the backing sheet 36. As explained in detail below, a segment 32 of the adhesive tape platform 30 includes one or more embedded energy sources (e.g., thin film batteries, common disk-shaped cell batteries, or rechargeable batteries or other energy storage devices, such as a super capacitor or charge pump) that can be configured to supply power to the wireless transducing circuit components 34 in the segment 32 in response to the detection of a change in capacitance between the segment 32 and the backing sheet 36 as a result of removing the segment 32 from the backing sheet 36.

Figure 3:
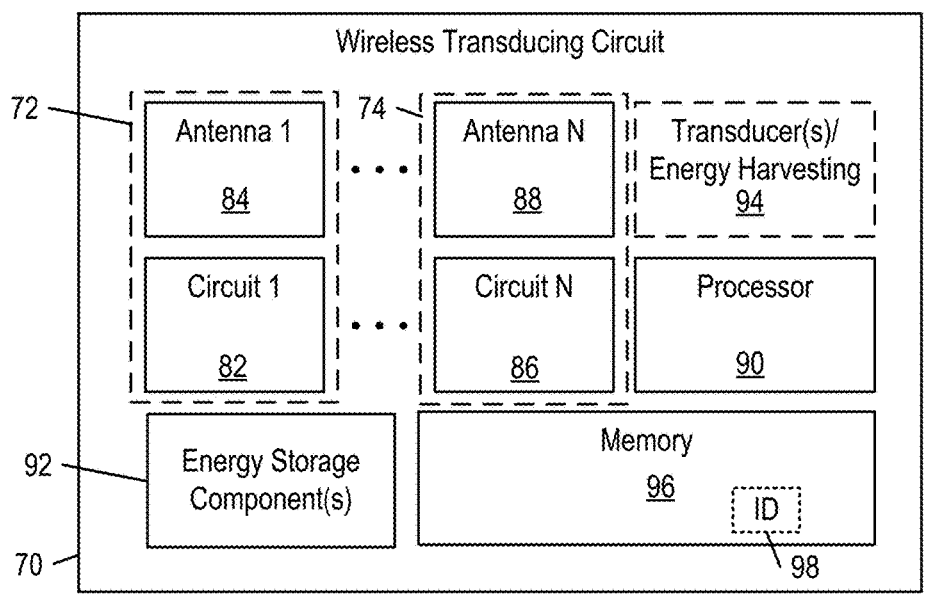
FIG. 3 is a schematic view of an example wireless transducing circuit.

FIG. 3 shows a block diagram of the components of an example wireless transducing circuit 70 that includes a number of communication systems 72, 74. Example communication systems 72, 74 include a GPS system that includes a GPS receiver circuit 82 (e.g., a receiver integrated circuit) and a GPS antenna 84, and one or more wireless communication systems each of which includes a respective transceiver circuit 86 (e.g., a transceiver integrated circuit) and a respective antenna 88. Example wireless communication systems include a cellular communication system (e.g., GSM/GPRS), a Wi-Fi communication system, an RF communication system (e.g., LoRa), a Bluetooth communication system (e.g., a Bluetooth Low Energy system), a Z-wave communication system, and a ZigBee communication system. The wireless transducing circuit 70 also includes a processor 90 (e.g., a microcontroller or microprocessor), one or more energy storage devices 92 (e.g., non-rechargeable or rechargeable printed flexible battery, conventional single or multiple cell battery, or a super capacitor or charge pump), one or more transducers 94 (e.g., sensors and/or actuators, and, optionally, one or more energy harvesting transducer components). In some examples, the conventional single or multiple cell battery may be a watch style disk or button cell battery that is associated electrical connection apparatus (e.g., a metal clip) that electrically connects the electrodes of the battery to contact pads on the flexible circuit 116.

Examples of sensing transducers 94 include a capacitive sensor, an altimeter, a gyroscope, an accelerometer, a temperature sensor, a strain sensor, a pressure sensor, a light sensor (e.g., a photodiode or a camera), a sound sensor (e.g., a microphone), a chemical sensor (e.g., an explosives detector), a biosensor (e.g., a blood glucose biosensor, odor detectors, antibody based pathogen, food, and water contaminant and toxin detectors, DNA detectors, microbial detectors, pregnancy detectors, and ozone detectors), and a humidity sensor. Examples of actuating (e.g., energy emitting) transducers 94 include light emitting components (e.g., light emitting diodes and displays), electro-acoustic transducers (e.g., audio speakers), electric motors, and thermal radiators (e.g., an electrical resistor or a thermoelectric cooler).

In some examples, the wireless transducing circuit 70 includes a memory 96 for storing data (e.g., state, event, and localization data, and a unique identifier 98, such as a media access control address, associated with the wireless transducing circuit 70). In some examples, the memory 96 may be incorporated into one or more of the processor 90 or transducers 94, or may be a separate component that is integrated in the wireless transducing circuit 70 as shown in FIG. 3.

Figure 4:
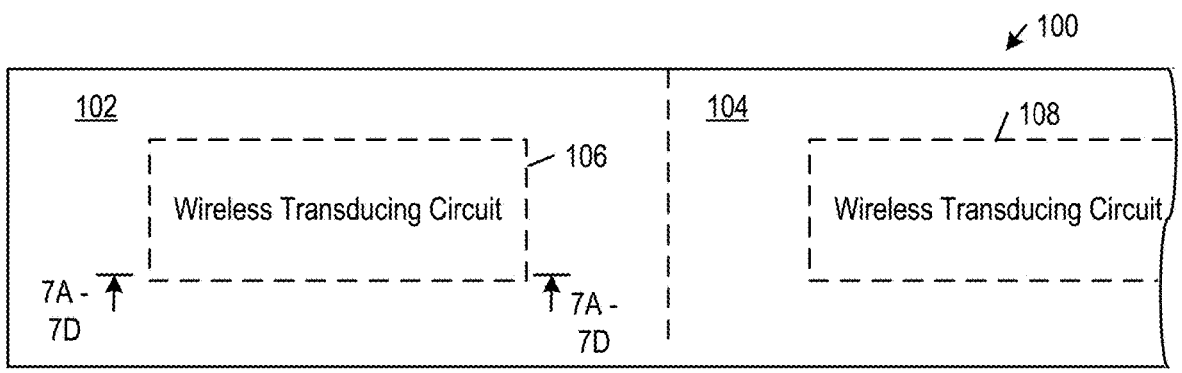
FIG. 4 is a diagrammatic top view of a length of an example adhesive tape platform.

FIG. 4 is a top view of a portion of an example flexible adhesive tape platform 100 that shows a first segment 102 and a portion of a second segment 104. Each segment 102, 104 of the flexible adhesive tape platform 100 includes a respective set 106, 108 of the components of the wireless transducing circuit 70. The segments 102, 104 and their respective sets of components 106, 108 typically are identical and configured in the same way. In some other embodiments, however, the segments 102, 104 and/or their respective sets of components 106, 108 are different and/or configured in different ways. For example, in some examples, different sets of the segments of the flexible adhesive tape platform 100 have different sets or configurations of tracking and/or transducing components that are designed and/or optimized for different applications, or different sets of segments of the flexible adhesive tape platform may have different ornamentations (e.g., markings on the exterior surface of the platform) and/or different (e.g., alternating) lengths.

An example method of fabricating the adhesive tape platform 100 (see FIG. 4) according to a roll-to-roll fabrication process is described in connection with FIGS. 6, 7A, and 7B of U.S. patent application Ser. No. 15/842,861, filed Dec. 14, 2017, the entirety of which application is incorporated herein by reference.

The instant specification describes an example system of adhesive tape platforms (also referred to herein as "tape nodes") that can be used to implement a low-cost wireless network infrastructure for performing monitoring, tracking, and other logistic functions relating to, for example, parcels, persons, tools, equipment and other physical assets and objects. The example system includes a set of three different types of tape nodes that have different respective functionalities and different respective cover markings that visually distinguish the different tape node types from one another. In one non-limiting example, the covers of the different tape node types are marked with different colors (e.g., white, green, and black). In the illustrated examples, the different tape node types are distinguishable from one another by their respective wireless communications capabilities and their respective sensing capabilities.

Figure 5A:
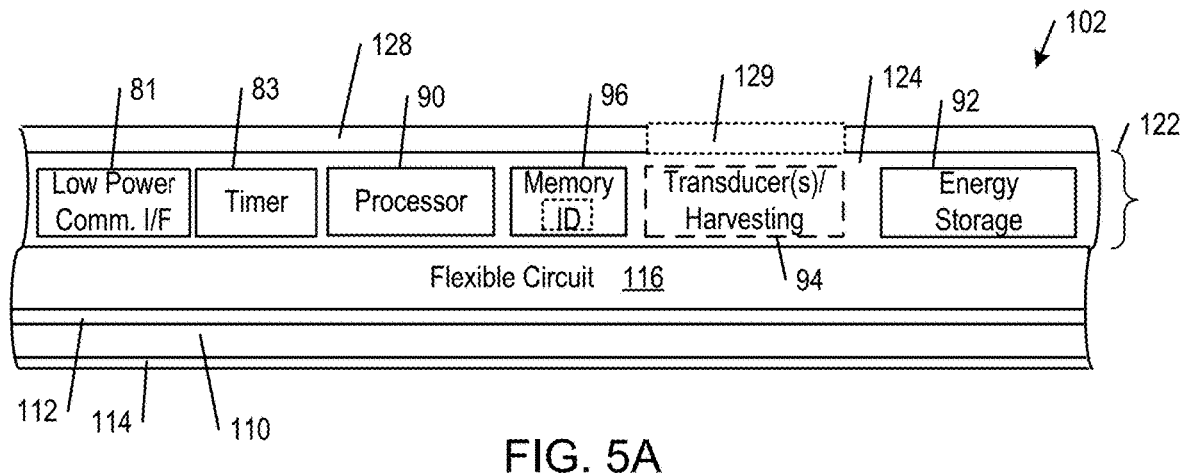
FIGS. 5A-5C show diagrammatic cross-sectional side views of portions of different respective adhesive tape platforms.

FIG. 5A shows a cross-sectional side view of a portion of an example segment 102 of the flexible adhesive tape platform 100 that includes a respective set of the components of the wireless transducing circuit 106 corresponding to the first tape node type (i.e., white). The flexible adhesive tape platform segment 102 includes an adhesive layer 112, an optional flexible substrate 110, and an optional adhesive layer 114 on the bottom surface of the flexible substrate 110. If the bottom adhesive layer 114 is present, a release liner (not shown) may be (weakly) adhered to the bottom surface of the adhesive layer 114. In some examples, the adhesive layer 114 includes an adhesive (e.g., an acrylic foam adhesive) that has a high bond strength that is sufficient to prevent removal of the adhesive segment 102 from a surface on which the adhesive layer 114 is adhered without destroying the physical or mechanical integrity of the adhesive segment 102 and/or one or more of its constituent components. In some examples, the optional flexible substrate 110 is implemented as a prefabricated adhesive tape that includes the adhesive layers 112, 114 and the optional release liner. In other examples, the adhesive layers 112, 114 are applied to the top and bottom surfaces of the flexible substrate 110 during the fabrication of the adhesive tape platform 100. The adhesive layer 112 bonds the flexible substrate 110 to a bottom surface of a flexible circuit 116, that includes one or more wiring layers (not shown) that connect the processor 90, a low power wireless communication interface 81 (e.g., a Bluetooth® Low Energy interface; also referred to as "BLE"), a timer circuit 83, transducing and/or energy harvesting component(s) 94 (if present), the memory 96, and other components in a device layer 122 to each other and to the energy storage component 92 and, thereby, enable the transducing, tracking and other functionalities of the flexible adhesive tape platform segment 102. The low power wireless communication interface 81 typically includes one or more of the antennas 84, 88 and one or more of the wireless circuits 82, 86.

Figure 5B:
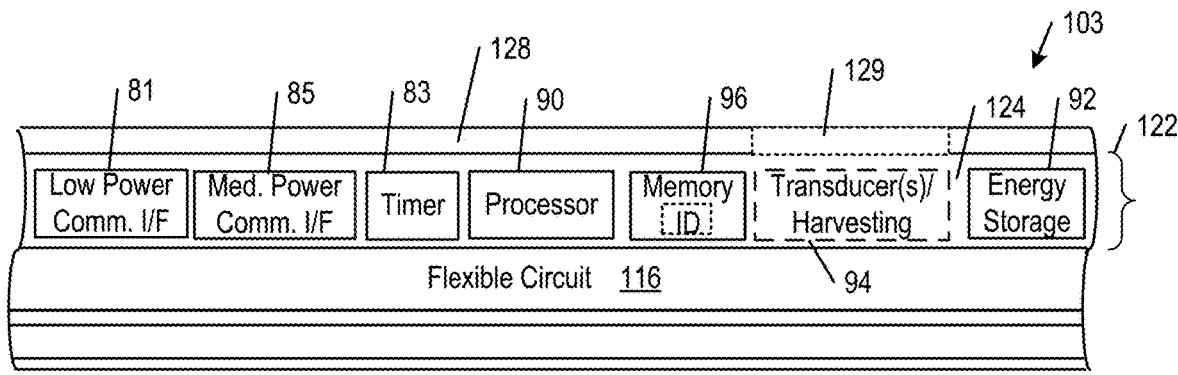

FIG. 5B shows a cross-sectional side view of a portion of an example segment 103 of the flexible adhesive tape platform 100 that includes a respective set of the components of the wireless transducing circuit 106 corresponding to the second tape node type (i.e., green). In this example, the flexible adhesive tape platform segment 103 differs from the segment 102 shown in FIG. 5A by the inclusion of a medium power communication interface 85 (e.g., a LoRa interface) in addition to the low power communications interface that is present in the first tape node type (i.e., white). In some examples, one or more other components of the flexible adhesive tape platform segment 103 differ, for example, in functionality or capacity (e.g., larger energy source).

Figure 5C:
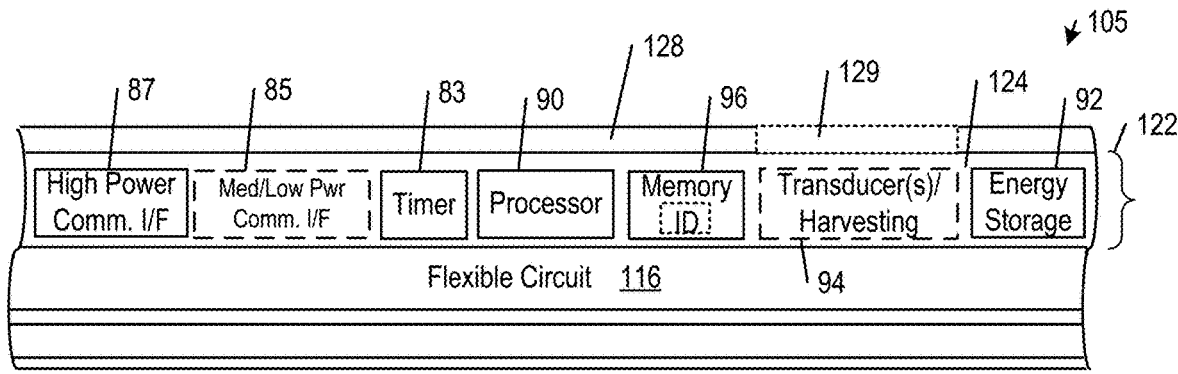

FIG. 5C shows a cross-sectional side view of a portion of an example segment 103 of the flexible adhesive tape platform 100 that includes a respective set of the components of the wireless transducing circuit 106 corresponding to the third tape node type (i.e., black). In this example, the flexible adhesive tape platform segment 103 includes a high power communications interface 87 (e.g., a cellular interface) and an optional medium and/or low power communications interface 85. In some examples, one or more other components of the flexible adhesive tape platform segment 103 differ, for example, in functionality or capacity (e.g., larger energy source). For example, in some examples, the medium power communications interface 85

FIGS. 5A-5C show examples in which the cover layer 128 of the flexible adhesive tape platform 100 includes one or more interfacial regions 129 over one or more of the transducers 94 that have features, properties, compositions, dimensions, and/or characteristics that are designed to improve the operating performance of the platform 100 for specific applications. In some examples, the flexible adhesive tape platform 100 includes multiple interfacial regions over respective transducers 94, which may be the same or different depending on the target applications. Example interfacial regions include an opening, an optically transparent window, and/or a membrane in the interfacial region 129 of the cover 128 located over one or more transducers 94.

In some examples, a flexible polymer layer 124 encapsulates the device layer 122 and thereby reduces the risk of damage that may result from the intrusion of contaminants and/or liquids (e.g., water). The flexible polymer layer 124 also planarizes the device layer 122. This facilitates optional stacking of additional layers on the device layer 122 and also distributes forces generated in, on, or across the adhesive tape platform segment 102 so as to reduce potentially damaging asymmetric stresses that might be caused by the application of bending, torqueing, pressing, or other forces on the flexible adhesive tape platform segment 102 during use. In some examples, a flexible cover 128 is bonded to the planarizing polymer 124 by an adhesive layer (not shown).

The flexible cover 128 and the flexible substrate 110 may have the same or different compositions depending on the intended application. The flexible cover 126 and the flexible substrate 110 typically include flexible film layers and/or paper substrates, which may have reflective surfaces or reflective surface coatings. Example compositions for the flexible film layers include polymer films, such as polyester, polyimide, polyethylene terephthalate (PET), and other plastics. The optional adhesive layer on the bottom surface of the flexible cover 128 and the adhesive layers 112, 114 on the top and bottom surfaces of the flexible substrate 110 typically include a pressure-sensitive adhesive (e.g., a silicon-based adhesive). In some examples, these adhesive layers are applied to the flexible cover 128 and the flexible substrate 110 during manufacture of the adhesive tape platform 100 (e.g., during a roll-to-roll or sheet-to-sheet fabrication process). In other examples, the flexible cover 126 may be implemented by a prefabricated single-sided pressure-sensitive adhesive tape and the flexible substrate 110 may be implemented by a prefabricated double-sided pressure-sensitive adhesive tape; both kinds of tape may be readily incorporated into a roll-to-roll or sheet-to-sheet fabrication process. In some examples, the flexible polymer layer 122 is composed of a flexible epoxy (e.g., silicone).

In some examples, the energy storage device 92 is a flexible battery that includes a printed electrochemical cell, which includes a planar arrangement of an anode and a cathode and battery contact pads. In some examples, the flexible battery may include lithium-ion cells or nickel-cadmium electro-chemical cells. The flexible battery typically is formed by a process that includes printing or laminating the electro-chemical cells on a flexible substrate (e.g., a polymer film layer). In some examples, other components may be integrated on the same substrate as the flexible battery. For example, the low power wireless communication interface 81 and/or the processor(s) 90 may be integrated on the flexible battery substrate. In some examples, one or more of such components also (e.g., the flexible antennas and the flexible interconnect circuits) may be printed on the flexible battery substrate.

In some examples, the flexible circuit 116 is formed on a flexible substrate by printing, etching, or laminating circuit patterns on the flexible substrate. In some examples, the flexible circuit 116 is implemented by one or more of a single-sided flex circuit, a double access or back bared flex circuit, a sculpted flex circuit, a double-sided flex circuit, a multi-layer flex circuit, a rigid flex circuit, and a polymer thick film flex circuit. A single-sided flexible circuit has a single conductor layer made of, for example, a metal or conductive (e.g., metal filled) polymer on a flexible dielectric film. A double access or back bared flexible circuit has a single conductor layer but is processed so as to allow access to selected features of the conductor pattern from both sides. A sculpted flex circuit is formed using a multi-step etching process that produces a flex circuit that has finished copper conductors that vary in thickness along their respective lengths. A multilayer flex circuit has three of more layers of conductors, where the layers typically are interconnected using plated through holes. Rigid flex circuits are a hybrid construction of flex circuit consisting of rigid and flexible substrates that are laminated together into a single structure, where the layers typically are electrically interconnected via plated through holes. In polymer thick film (PTF) flex circuits, the circuit conductors are printed onto a polymer base film, where there may be a single conductor layer or multiple conductor layers that are insulated from one another by respective printed insulating layers.

In the example flexible adhesive tape platform segments 102 shown in FIGS. 5A-5C, the flexible circuit 116 is a single access flex circuit that interconnects the components of the adhesive tape platform on a single side of the flexible circuit 116. In other examples, the flexible circuit 116 is a double access flex circuit that includes a front-side conductive pattern that interconnects the low power communications interface 81, the timer circuit 83, the processor 90, the one or more transducers 94 (if present), and the memory 96, and allows through-hole access (not shown) to a back-side conductive pattern that is connected to the flexible battery (not shown). In these examples, the front-side conductive pattern of the flexible circuit 116 connects the communications circuits 82, 86 (e.g., receivers, transmitters, and transceivers) to their respective antennas 84, 88 and to the processor 90, and also connects the processor 90 to the one or more sensors 94 and the memory 96. The backside conductive pattern connects the active electronics (e.g., the processor 90, the communications circuits 82, 86, and the transducers) on the front-side of the flexible circuit 116 to the electrodes of the flexible battery 116 via one or more through holes in the substrate of the flexible circuit 116.

Depending on the target application, the wireless transducing circuits 70 are distributed across the flexible adhesive tape platform 100 according to a specified sampling density, which is the number of wireless transducing circuits 70 for a given unit size (e.g., length or area) of the flexible adhesive tape platform 100. In some examples, a set of multiple flexible adhesive tape platforms 100 that include different respective sampling densities in order to seal different package sizes with a desired number of wireless transducing circuits. In particular, the number of wireless transducing circuits per package size is given by the product of the sampling density specified for the adhesive tape platform and the respective size of the adhesive tape platform 100 needed to seal the package. This allows an automated packaging system to select the appropriate type of flexible adhesive tape platform 100 to use for sealing a given package with the desired redundancy (if any) in the number of wireless transducer circuits 70. In some example applications (e.g., shipping low value goods), only one wireless transducing circuit 70 is used per package, whereas in other applications (e.g., shipping high value goods) multiple wireless transducing circuits 70 are used per package. Thus, a flexible adhesive tape platform 100 with a lower sampling density of wireless transducing circuits 70 can be used for the former application, and a flexible adhesive tape platform 100 with a higher sampling density of wireless transducing circuits 70 can be used for the latter application. In some examples, the flexible adhesive tape platforms 100 are color-coded or otherwise marked to indicate the respective sampling densities with which the wireless transducing circuits 70 are distributed across the different types of adhesive tape platforms 100.

Some logistics applications do not require tracking and/or sensor data for every package shipped. Instead, sufficient information for decision-making can be obtained by collecting data from a sample of the packages shipped. In these example, a substantial reduction in shipping costs can be realized by selecting a sampling density of the deployed wireless transducing circuits 70 that achieves a target tracked package sampling rate that is less than unity. In these embodiments, some packages would not be tracked or monitored. However, the sample size can be selected to be sufficient to make inferences about the total population of packages shipped with a desired level of accuracy.

Figure 6A:
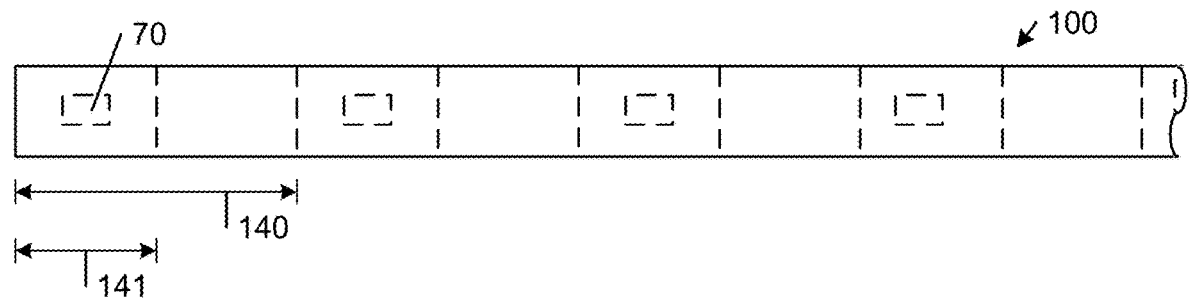
FIGS. 6A-6D show diagrammatic top views of respective lengths of examples of different respective flexible adhesive tape platforms.

For example, FIG. 6A shows an example length of the flexible adhesive tape platform 100 in which the sampling density is 0.5 (i.e., one wireless transducing circuit per two unit lengths 141 of the flexible adhesive tape platform 100). In this example, assuming the unit length corresponds to the length of the flexible adhesive tape platform 100 needed to seal a package and the flexible adhesive tape platform 100 is cut along the dashed lines, half of the packages would be sealed with a length of the flexible adhesive platform 100 that includes wireless transducing circuits 70.

Figure 6B:
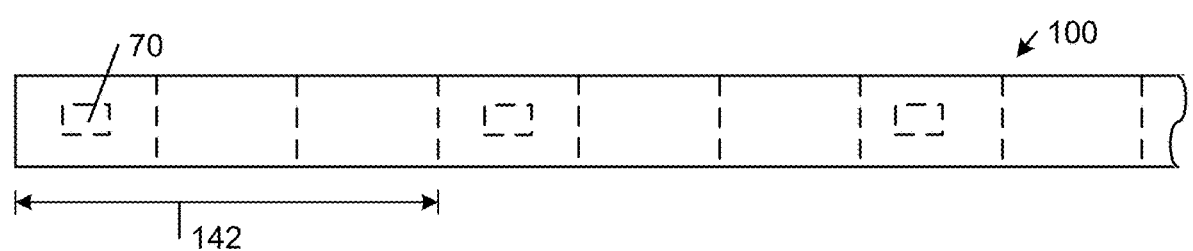

FIG. 6B shows an example length of the flexible adhesive tape platform 100 in which the sampling density is one-third (i.e., one wireless transducing circuit per three unit lengths 141 of the flexible adhesive tape platform 100). In this example, assuming the unit length corresponds to the length of the flexible adhesive tape platform 100 needed to seal a package and the flexible adhesive tape platform 100 is cut along the dashed lines, one third of the packages would be sealed with a length of the flexible adhesive platform 100 that includes wireless transducing circuits 70.

Figure 6C:
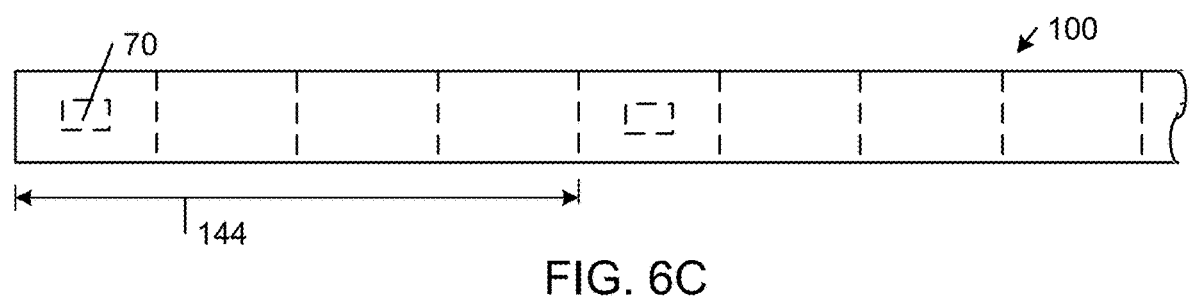

FIG. 6C shows an example length of the flexible adhesive tape platform 100 in which the sampling density is 0.25 (i.e., one wireless transducing circuit per four unit lengths 141 of the flexible adhesive tape platform 100). In this example, assuming the unit length corresponds to the length of the flexible adhesive tape platform 100 needed to seal a package and the flexible adhesive tape platform 100 is cut along the dashed lines, one fourth of the packages be sealed with a length of the flexible adhesive platform 100 that includes wireless transducing circuits 70.

Figure 6D:
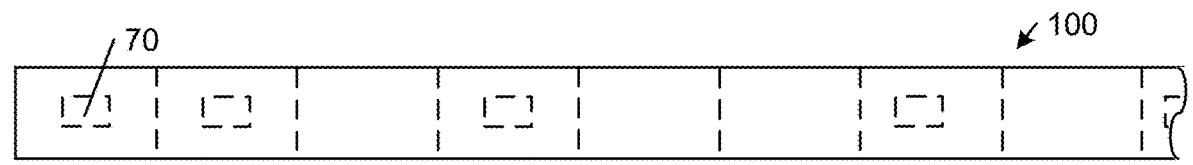

FIG. 6D shows an example length of the flexible adhesive tape platform 100 in which the sampling density is 0.25 (i.e., one wireless transducing circuit per two unit lengths 141 of the flexible adhesive tape platform 100). In this example, the wireless transducing circuits 70 are pseudo randomly distributed along the length of the flexible adhesive tape platform 100 according to a probability distribution. Assuming the unit length corresponds to the length of the flexible adhesive tape platform 100 needed to seal a package and the flexible adhesive tape platform 100 is cut along the dashed lines, one half of the packages would be sealed with a length of the flexible adhesive platform 100 that includes wireless transducing circuits 70.

In the examples shown in FIGS. 6A-6D, a plurality of wireless transducing circuits 70 is distributed across the continuous flexible adhesive tape platforms 100 according to a respective sampling density. Each wireless transducing circuit 70 includes an antenna, a wireless communications circuit coupled to the antenna, a transducer, a controller electrically connected to the wireless communications circuit and the transducer, and an energy source connected to the controller, the transducer, and the wireless communications circuit. In some examples, the wireless transducing circuits are uniform in function and composition. In some examples, the sampling density is the density of wireless transducing circuits 70 as a function of a unit size of the continuous flexible adhesive tape platform. In some examples, the wireless transducing circuits are interspersed among regions of the continuous flexible adhesive tape platform 100 that are free of any wireless transducing circuits. In some applications, the wireless transducing circuits 70 are interspersed among the regions of the continuous flexible adhesive tape platform 100 that are free of any wireless transducing circuits according to a linear sampling density. In some examples, each of the regions of the continuous flexible adhesive tape platform 100 that are free of any wireless transducing circuits 70 is free of active electrical components. In other applications, the wireless transducing circuits 70 are interspersed among the regions of the continuous flexible adhesive tape platform 100 that are free of any wireless transducing circuits 70 according to an areal sampling density. In some examples, the wireless transducing circuits 70 are distributed at regular intervals along the continuous flexible adhesive tape platform 100. In some examples, the wireless transducing circuits 70 are distributed across the continuous flexible adhesive tape platform 100 according to a probability distribution. In some examples, the continuous flexible adhesive tape platform 100 is carried on a cylindrical tape core. In some examples, the regions of the continuous flexible adhesive tape platform 100 that include wireless transducing circuits 70 are visually indistinguishable from other regions of the continuous flexible adhesive tape platform 100.

In some examples, multiple different types continuous flexible adhesive tape platforms 100 are bundled together and packaged as a set. In these examples, the continuous flexible adhesive tape platforms 100 typically are carried on respective cylindrical tape cores and include respective pluralities of wireless transducing circuits 70 distributed across the respective platforms 100 according to respective sampling densities at least two of which are different. In some examples, a first continuous flexible adhesive tape platform 100 in the set includes a backing that includes a first visible marking and a second continuous flexible adhesive tape platform includes a backing that includes a second visible marking that is different from the first visible marking. In some examples, the first and second continuous flexible adhesive tape platforms are color-coded differently (e.g., the backing of different tape platforms are different respective colors).

In some examples, the continuous flexible adhesive tape platforms 100 are used to monitor packages. In accordance with one example, unit size portions of a continuous flexible adhesive tape platform 100 are dispensed, where the continuous flexible adhesive tape platform 100 includes a plurality of wireless transducing circuits 70 distributed across the platform according to a sampling density of wireless transducing circuits 70 as a function of the unit size portions of the continuous flexible adhesive tape platform and the sampling density is less than 1. The dispensed portion of the continuous flexible adhesive tape platform is affixed to seal a package. A network node of a network service (e.g., the network service 54 of an inventory management system) establishes a wireless connection with the wireless transducing circuit 70 in the affixed dispensed portion of continuous flexible adhesive tape platform. Based on a successful establishment of the wireless connection with the wireless transducing circuit 70, a unique identifier of the wireless transducing circuit and transducer data from the wireless transducing circuit are obtained. The obtained transducer data is reported in association with the unique identifier to a network node of a network service (e.g., the network service 54 of an inventory management system). In some examples, the obtained transducer data includes geographic location data. In some examples the obtained transducer data includes sensor data characterizing ambient conditions in the vicinity of the dispensed portion of the continuous flexible adhesive tape platform 100.

Because battery power is finite and the power needs of any particular adhesive tape platform segment generally is unknown, some examples of the adhesive tape platform segments are preconfigured in a power-off state and remain in the power-off state until a predetermined event occurs. In some cases, the predetermined event indicates that the adhesive tape platform segment has been deployed for use in the field. Example events include cutting a segment of an adhesive tape platform from a roll, bending a segment of an adhesive tape platform as it is being peeled off of a roll, separating a segment of an adhesive tape platform from a backing sheet, and detecting a change in state of the adhesive tape platform or its environment. In some examples, a label is affixed to packaging containing the continuous flexible adhesive tape platform 100, where the label has markings (e.g., text and/or bar code) that include an indication of the sampling density of wireless transducing circuits as a function of a unit size of the continuous flexible adhesive tape platform. In some examples, the unit size corresponds to a length dimension; in other examples the unit size corresponds to an areal dimension.

Figure 7A:
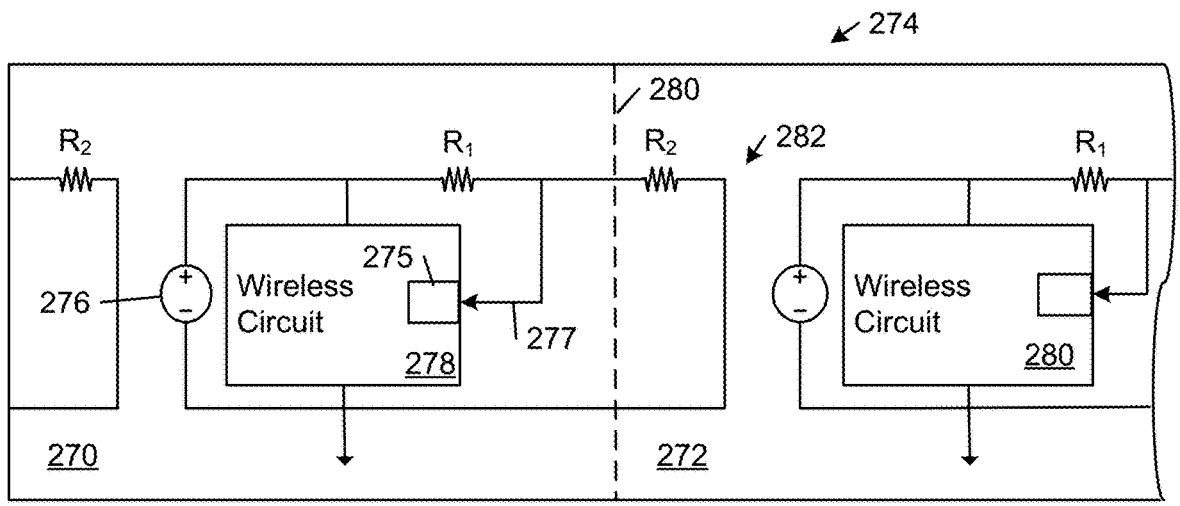
FIG. 7A is a diagrammatic top view of a length of an example flexible adhesive tape platform.

Referring to FIG. 7A, in some examples, each of one or more of the segments 270, 272 of a flexible adhesive tape platform 274 includes a respective wake circuit 275 that delivers power from the respective energy source 276 to the respective wireless circuit 278 (e.g., a processor, one or more transducers, and one or more wireless communications circuits) in response to an event. In some of these examples, the wake circuit 275 is configured to transition from an off state to an on state when the voltage on the wake node 277 exceeds a threshold level, at which point the wake circuit transitions to an on state to power-on the segment 270. In the illustrated example, this occurs when the user separates the segment from the adhesive tape platform 274, for example, by cutting across the adhesive tape platform 274 at a designated location (e.g., along a designated cut-line 280). In particular, in its initial, un-cut state, a minimal amount of current flows through the resistors $R_1$ and $R_2$. As a result, the voltage on the wake node 270 remains below the threshold turn-on level. After the user cuts across the adhesive tape platform 274 along the designated cut-line 280, the user creates an open circuit in the loop 282, which pulls the voltage of the wake node above the threshold level and turns on the wake circuit 275. As a result, the voltage across the energy source 276 will appear across the wireless circuit 278 and, thereby, turn on the segment 270. In particular embodiments, the resistance vale of resistor $R_1$ is greater than the resistance value of $R_2$. In some examples, the resistance values of resistors $R_1$ and $R_2$ are selected based on the overall design of the adhesive product system (e.g., the target wake voltage level and a target leakage current).

In some examples, each of one or more of the segments of an adhesive tape platform includes a respective sensor and a respective wake circuit that delivers power from the respective energy source to the respective one or more of the respective wireless circuit components 278 in response to an output of the sensor. In some examples, the respective sensor is a strain sensor that produces a wake signal based on a change in strain in the respective segment. In some of these examples, the strain sensor is affixed to a adhesive tape platform and configured to detect the stretching of the tracking adhesive tape platform segment as the segment is being peeled off a roll or a sheet of the adhesive tape platform. In some examples, the respective sensor is a capacitive sensor that produces a wake signal based on a change in capacitance in the respective segment. In some of these examples, the capacitive sensor is affixed to an adhesive tape platform and configured to detect the separation of the tracking adhesive tape platform segment from a roll or a sheet of the adhesive tape platform. In some examples, the respective sensor is a flex sensor that produces a wake signal based on a change in curvature in the respective segment. In some of these examples, the flex sensor is affixed to a adhesive tape platform and configured to detect bending of the tracking adhesive tape platform segment as the segment is being peeled off a roll or a sheet of the adhesive tape platform. In some examples, the respective sensor is a near field communications sensor that produces a wake signal based on a change in inductance in the respective segment.

Figure 7B:
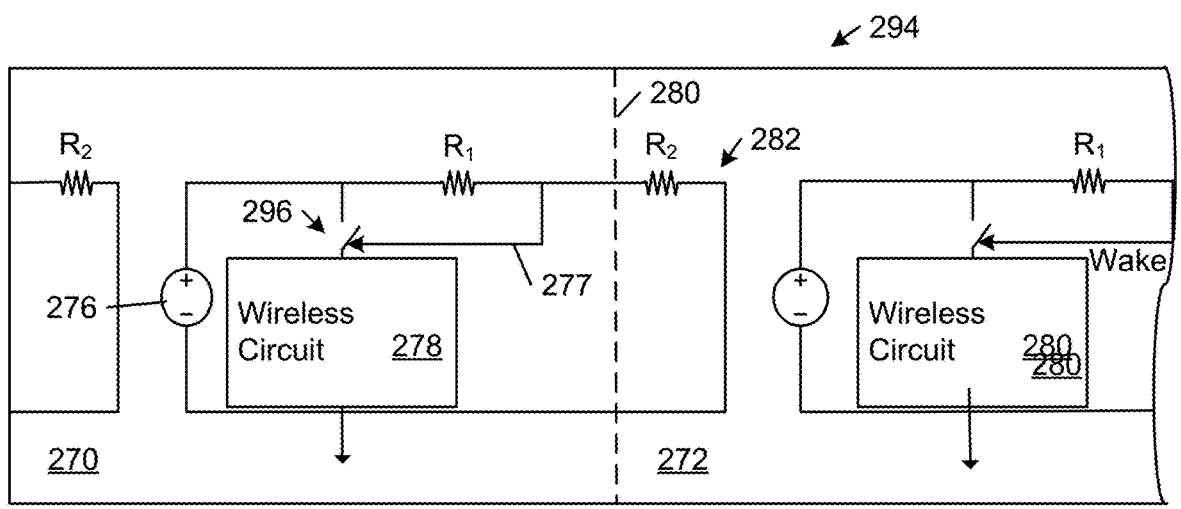
FIG. 7B is a diagrammatic top view of a length of an example flexible adhesive tape platform.

FIG. 7B shows another example of an adhesive tape platform 294 that delivers power from the respective energy source 276 to the respective tracking circuit 278 (e.g., a processor, one or more transducers, and one or more wireless communications circuits) in response to an event. This example is similar in structure and operation as the adhesive tape platform 294 shown in FIG. 9A, except that the wake circuit 275 is replaced by a switch 296 that is configured to transition from an open state to a closed state when the voltage on the switch node 277 exceeds a threshold level. In the initial state of the adhesive tape platform 294, the voltage on the switch node is below the threshold level as a result of the low current level flowing through the resistors $R_1$ and $R_2$. After the user cuts across the adhesive tape platform 294 along the designated cut-line 280, the user creates an open circuit in the loop 282, which pulls up the voltage on the switch node above the threshold level to close the switch 296 and turn on the wireless circuit 278.

Figure 7C:
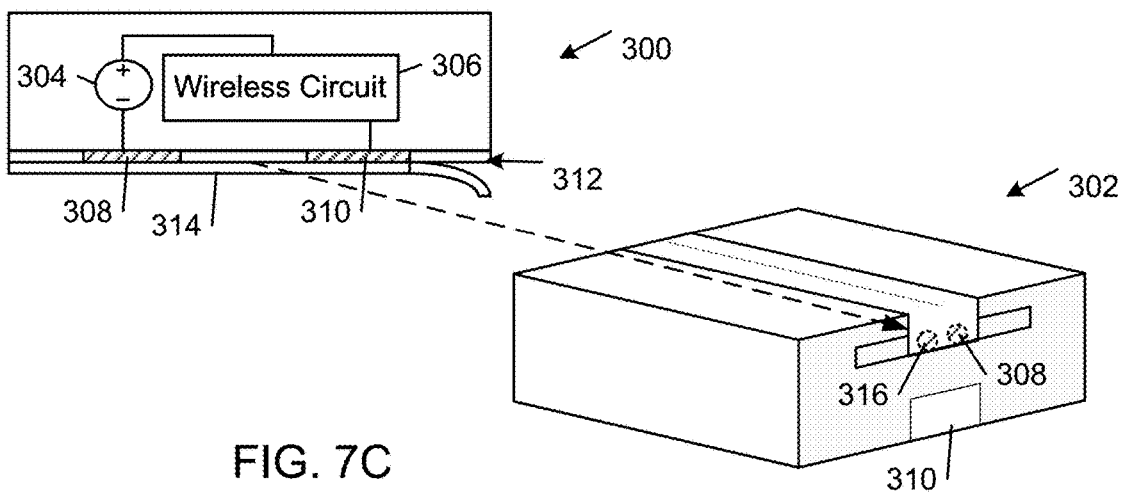
FIG. 7C is diagrammatic cross-sectional side view of an example flexible adhesive tape platform and an example package.

FIG. 7C shows a diagrammatic cross-sectional front view of an example adhesive tape platform 300 and a perspective view of an example package 302. Instead of activating the adhesive tape platform in response to separating a segment of the adhesive tape platform from a roll or a sheet of the adhesive tape platform, this example is configured to supply power from the energy source 302 to turn on the tracking circuit 306 in response to establishing an electrical connection between two power terminals 308, 310 that are integrated into the adhesive tape platform. In particular, each segment of the adhesive tape platform 300 includes a respective set of embedded tracking components, an adhesive layer 312, and an optional backing sheet 314 with a release coating that prevents the segments from adhering strongly to the backing sheet 314. In some examples, the power terminals 308, 310 are composed of an electrically conductive material (e.g., a metal, such as copper) that may be printed or otherwise patterned and/or deposited on the backside of the adhesive tape platform 300. In operation, the adhesive tape platform can be activated by removing the backing sheet 314 and applying the exposed adhesive layer 312 to a surface that includes an electrically conductive region 316. In the illustrated embodiment, the electrically conductive region 316 is disposed on a portion of the package 302. When the adhesive backside of the adhesive tape platform 300 is adhered to the package with the exposed terminals 308, 310 aligned and in contact with the electrically conductive region 316 on the package 302, an electrical connection is created through the electrically conductive region 316 between the exposed terminals 308, 310 that completes the circuit and turns on the tracking circuit 306. In particular embodiments, the power terminals 308, 310 are electrically connected to any respective nodes of the tracking circuit 306 that would result in the activation of the tracking circuit 306 in response to the creation of an electrical connection between the power terminals 308, 310.

In some examples, after a tape node is turned on, it will communicate with the network service 404 to confirm that the user/operator who is associated with the tape node is an authorized user who has authenticated himself or herself to the network service 54. In these examples, if the tape node cannot confirm that the user/operator is an authorized user, the tape node will turn itself off.

Figure 8:
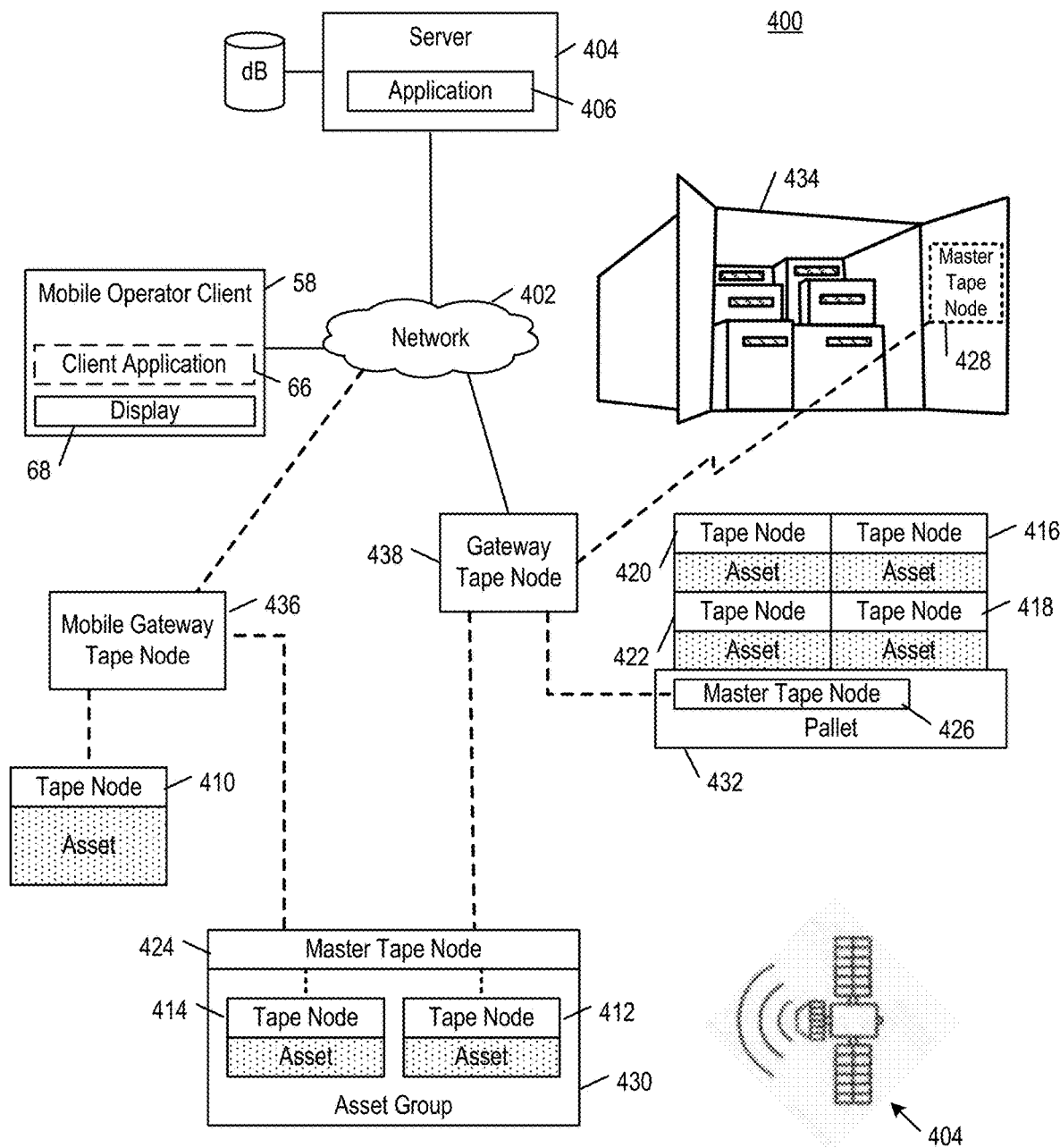
FIG. 8 is a diagrammatic view of an example of a network environment supporting communications with segments of an adhesive tape platform.

FIG. 8 shows an example network communications environment 400 that includes a network 402 that supports communications between one or more servers 404 of a network service, a client device 406, and various types of tape nodes that are associated with various assets (e.g., parcels and other objects). In some examples, the network 402 includes one or more network communication systems and technologies, including any one or more of wide area networks, local area networks, public networks (e.g., the internet), private networks (e.g., intranets and extranets), wired networks, and wireless networks. For example, the network 402 includes communications infrastructure equipment, such as geolocation satellite systems 404 (e.g., GPS, GLONASS, and NAVSTAR), cellular communication systems (e.g., GSM/GPRS), Wi-Fi communication systems, RF communication systems (e.g., LoRa), Bluetooth communication systems (e.g., a Bluetooth Low Energy system), Z-wave communication systems, and ZigBee communication systems.

In some examples, a network service application 406 leverages the above-mentioned communications technologies to create a hierarchical wireless network of tape nodes that reduces costs and improves efficiency, from parcel sealing, parcel transporting, parcel tracking, parcel condition monitoring, parcel inventorying, and parcel security verification. The tape nodes may be deployed by automated equipment or manually. In this process, a tape node typically is separated from a roll or sheet and adhered to a parcel or other mobile object (e.g., a vehicle, such as a delivery truck) or stationary object (e.g., a structural element of a building). This process activates the tape node and causes the tape node to communicate with the server. In this process, the tape node may communicate through one or more other tape nodes. In this process, the network server 404 executes the network service application 406 to programmatically configure tape nodes that are deployed in the environment 400. There are multiple classes or types of tape nodes, where each tape node class has a different respective set of functionalities and/or capacities.

In the example shown in FIG. 8, there are three classes of tape nodes: a short range tape node, a medium range tape node, and a long range tape node, as respectively shown in FIGS. 5A-5C.

The short range tape nodes typically are adhered directly to parcels containing assets. In the illustrated example, the tape nodes 410-422 are short range tape nodes. The short range tape nodes typically communicate with a low power wireless communication protocol (e.g., Bluetooth LE, Zigbee, or Z-wave).

The medium range tape nodes typically are adhered to objects (e.g., a box 430, a pallet 432, and a shipping container 434) that are associated with multiple parcels that are separated from the medium range tape nodes by a barrier or a large distance. In the illustrated example, the tape nodes 424, 426, and 428 are medium range tape nodes. The medium range tape nodes typically communicate with a medium power wireless communication protocol (e.g., LoRa or Wi-Fi).

The long range tape nodes typically are adhered to infrastructure of the wireless communication environment 400. In the illustrated example, the mobile gateway tape node 436 and the gateway tape node 438 are long range tape nodes. The long range tape nodes typically communicate with other nodes using a high power wireless communication protocol (e.g., a cellular data communication protocol). In some examples, the mobile gateway tape node 436 is adhered to a mobile vehicle (e.g., a truck). In these examples, the mobile gateway may be moved to different locations in the environment 400 to assist in connecting other tape nodes to the server 404. In some examples, the gateway tape node may be attached to a stationary structure (e.g., a wall) in the environment 400 with a known geographic location. In these examples, other tape nodes in the environment can determine their geographic location by querying the gateway tape node 438.

In the example illustrated in FIG. 8, the application 406 has designated the tape node 424 as the master tape node for the group of tape nodes 412, 414 contained within the box 430. In this role, the master tape node 424 queries the tape nodes 412, 414 during the scheduled time interval to obtain information about the location and status of the tape nodes 412, 414, which information the master tape node 424 transmits to either the mobile gateway tape node 436 or the gateway tape node 438 for transmission to the server 404.

The master tape node 424 also queries the tape nodes 412, 414 during the scheduled time interval for local parcel condition data. In some examples, the local parcel condition data includes a time series of sensor measurement data collected by the tape nodes 414, 412. In other examples, the local parcel condition data includes sensor data that has been processed by the tape nodes (e.g., a histogram of collected measurement values and the total number of data values in the histogram). In some examples, the master tape node 424 processes the processed sensor data received from the tape nodes 412, 414 by combining the processed sensor data into a single data set (e.g., by combining histograms based on the total numbers of data values in the histograms).

Figure 9:
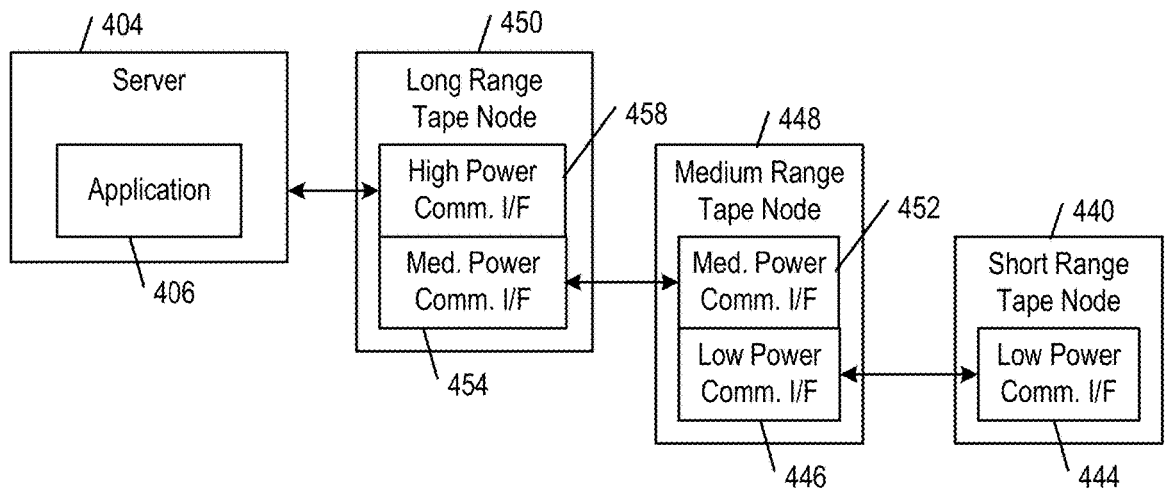
FIG. 9 is a diagrammatic view of a hierarchical communications network.

FIG. 9 shows an example hierarchical wireless communications network of tape nodes. In this example, the short range tape node 440 and the medium range tape node 442 communicate with one another over their respective low power wireless communication interfaces 444, 446. The medium range tape node 448 and the long range tape node 450 communicate with one another over their respective medium power wireless communication interfaces 452, 454. The long range tape node 450 and the network server 404 communicate with one another over the high power wireless communication interface 458.

In some examples, the low power communication interfaces 444, 446 establish wireless communications with one another in accordance with the Bluetooth LE protocol. The medium power communication interfaces 452, 454 establish wireless communications with one another in accordance with the LoRa communications protocol. The high power communication interface 458 establishes wireless communications with the server 404 in accordance with the cellular communications protocol.

Figure 10:
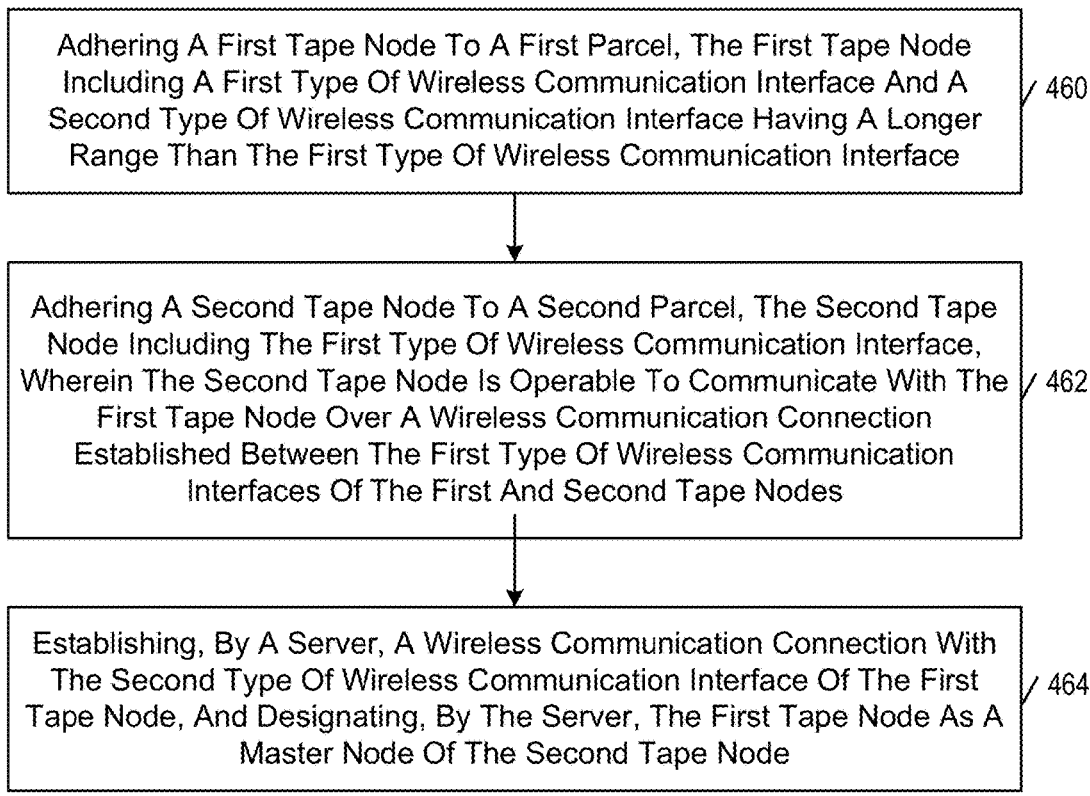
FIG. 10 is a flow diagram of a method of creating a hierarchical communications network.

FIG. 10 shows an example method of creating a hierarchical communications network. In accordance with this method, a first tape node is adhered to a first parcel in a set of associated parcels, the first tape node including a first type of wireless communication interface and a second type of wireless communication interface having a longer range than the first type of wireless communication interface (FIG. 10, block 460). A second tape node is adhered to a second parcel in the set, the second tape node including the first type of wireless communication interface, wherein the second tape node is operable to communicate with the first tape node over a wireless communication connection established between the first type of wireless communication interfaces of the first and second tape nodes (FIG. 10, block 462). An application executing on a computer system establishes a wireless communication connection with the second type of wireless communication interface of the first tape node, and the application transmits programmatic code executable by the first tape node to function as a master tape node with respect to the second tape node (FIG. 10, block 464).

Exemplary Computer Apparatus

Figure 11:
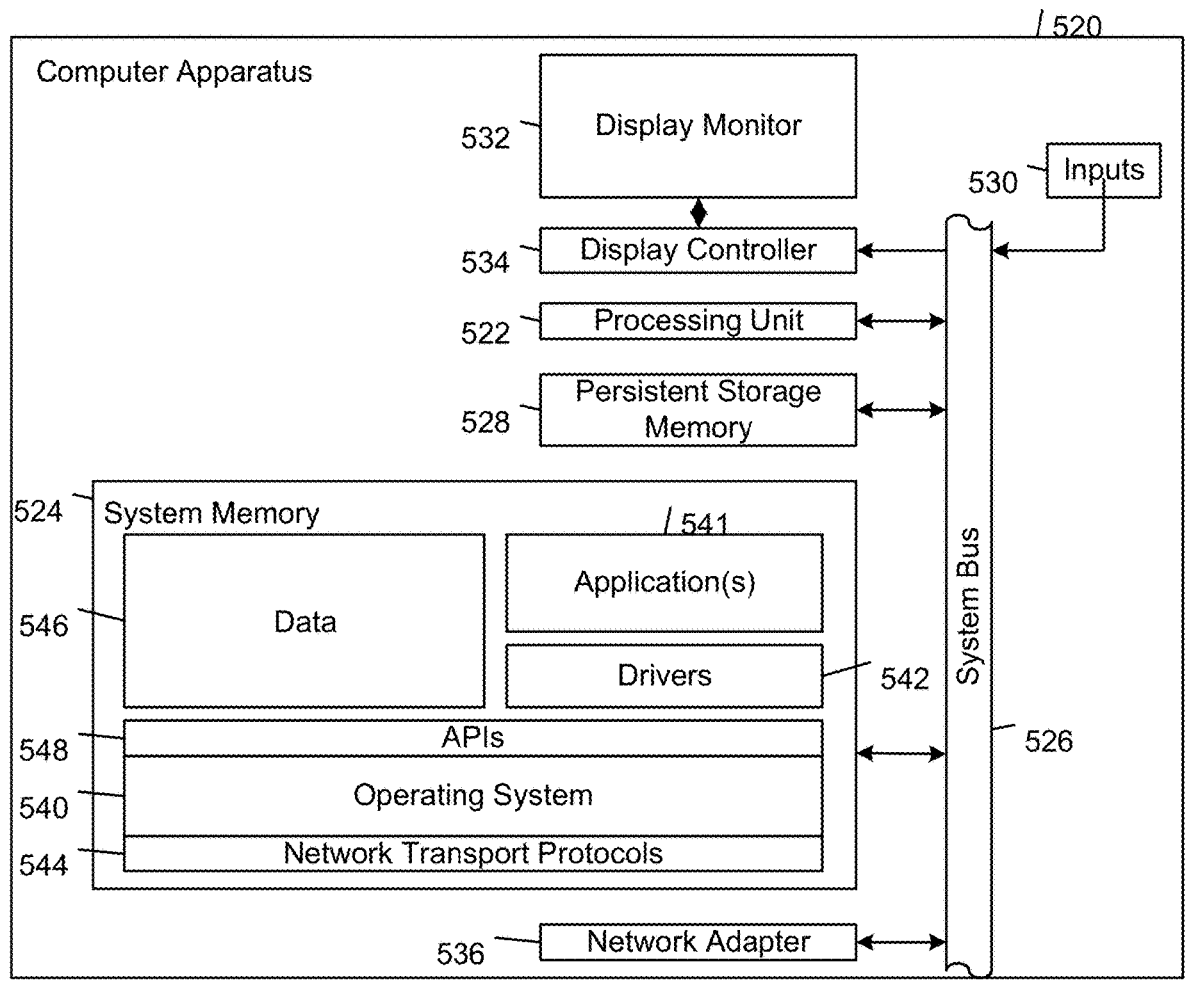
FIG. 11 is a block diagram of an example computer apparatus.

FIG. 11 shows an example embodiment of computer apparatus that is configured to implement one or more of the computing systems described in this specification. The computer apparatus 520 includes a processing unit 522, a system memory 524, and a system bus 526 that couples the processing unit 522 to the various components of the computer apparatus 520. The processing unit 522 may include one or more data processors, each of which may be in the form of any one of various commercially available computer processors. The system memory 524 includes one or more computer-readable media that typically are associated with a software application addressing space that defines the addresses that are available to software applications. The system memory 524 may include a read only memory (ROM) that stores a basic input/output system (BIOS) that contains start-up routines for the computer apparatus 520, and a random access memory (RAM). The system bus 526 may be a memory bus, a peripheral bus or a local bus, and may be compatible with any of a variety of bus protocols, including PCI, VESA, Microchannel, ISA, and EISA. The computer apparatus 520 also includes a persistent storage memory 528 (e.g., a hard drive, a floppy drive, a CD ROM drive, magnetic tape drives, flash memory devices, and digital video disks) that is connected to the system bus 526 and contains one or more computer-readable media disks that provide non-volatile or persistent storage for data, data structures and computer-executable instructions.

A user may interact (e.g., input commands or data) with the computer apparatus 520 using one or more input devices 530 (e.g. one or more keyboards, computer mice, microphones, cameras, joysticks, physical motion sensors, and touch pads). Information may be presented through a graphical user interface (GUI) that is presented to the user on a display monitor 532, which is controlled by a display controller 534. The computer apparatus 520 also may include other input/output hardware (e.g., peripheral output devices, such as speakers and a printer). The computer apparatus 520 connects to other network nodes through a network adapter 536 (also referred to as a "network interface card" or NIC).

A number of program modules may be stored in the system memory 524, including application programming interfaces 538 (APIs), an operating system (OS) 540 (e.g., the Windows® operating system available from Microsoft Corporation of Redmond, Washington U.S.A.), software applications 541 including one or more software applications programming the computer apparatus 520 to perform one or more of the steps, tasks, operations, or processes of the hierarchical classification systems described herein, drivers 542 (e.g., a GUI driver), network transport protocols 544, and data 546 (e.g., input data, output data, program data, a registry, and configuration settings).

Examples of the subject matter described herein, including the disclosed systems, methods, processes, functional operations, and logic flows, can be implemented in data processing apparatus (e.g., computer hardware and digital electronic circuitry) operable to perform functions by operating on input and generating output. Examples of the subject matter described herein also can be tangibly embodied in software or firmware, as one or more sets of computer instructions encoded on one or more tangible non-transitory carrier media (e.g., a machine readable storage device, substrate, or sequential access memory device) for execution by data processing apparatus.

The details of specific implementations described herein may be specific to particular embodiments of particular inventions and should not be construed as limitations on the scope of any claimed invention. For example, features that are described in connection with separate embodiments may also be incorporated into a single embodiment, and features that are described in connection with a single embodiment may also be implemented in multiple separate embodiments. In addition, the disclosure of steps, tasks, operations, or processes being performed in a particular order does not necessarily require that those steps, tasks, operations, or processes be performed in the particular order; instead, in some cases, one or more of the disclosed steps, tasks, operations, and processes may be performed in a different order or in accordance with a multi-tasking schedule or in parallel.

ADDITIONAL EMBODIMENTS

The following is a listing of example sets of additional embodiments related to aspects of the embodiments described above. Each set of additional embodiments relates to one or more of asset monitoring, location management, and logistics in the context of wireless node communications and sensing networks.

Additional Embodiment 1—Scheduling Wireless Autonomous Tape Agents

1. A method of scheduling wireless autonomous tape agents in a hierarchy of levels, comprising:
by the wireless autonomous tape agents, synchronizing with respect to a timing reference;
propagating, by a server, scheduling instructions in a global scheduling description language to the wireless autonomous tape agents in the hierarchy of levels, wherein the propagating comprises transmitting a respective subset of the global scheduling description language instructions in a preceding level in the hierarchy to each wireless autonomous tape agent in a successive level lower in the hierarchy, and repeating the transmitting for each successive level lower in the hierarchy; and
executing, by the wireless autonomous tape agents, the respective instructions to create a monitoring network for packages.
2. The method of claim 1, wherein the propagating comprises restricting the propagation of global scheduling description language from a preceding level in the hierarchy to a successive lower level in the hierarchy to a subset of the global scheduling description language that is relevant to the wireless autonomous tape agents in the successive lower levels in the hierarchy.
3. The method of claim 1, wherein the timing reference is a timer component of the server.
4. The method of claim 1, wherein the timing reference of a clock component of the server.
5. The method of claim 1, wherein the propagating comprises, by the server, transmitting global scheduling description language instructions to wake each of respective ones of the wireless autonomous tape agents.
6. The method of claim 5, wherein the global scheduling description language instructions comprise one or more of: an instruction specifying a schedule of wake times; an instruction specifying a wake up frequency; an instruction specifying a wake window; and an instruction specifying one or more wake up conditions.
7. The method of claim 6, wherein the one or more wake up conditions comprise one or more of an acceleration level above a threshold acceleration, a shock level above threshold shock level, and a temperature level above a threshold temperature level.
8. The method of claim 7, wherein respective ones of the wireless autonomous tape agents comprise accelerometers.
9. The method of claim 7, wherein respective ones of the wireless autonomous tape agents comprise shock sensors.
10. The method of claim 1, wherein the propagating comprises, by the server, transmitting parameter values to configure respective ones of the wireless autonomous tape agents to perform operations.

11. The method of claim 1, further comprising:

grouping, by the server, a set of packages each associated with a respective wireless autonomous tape agent;

designating, by the server, one of the wireless autonomous tape agents as a master wireless autonomous tape agent and designating other ones of the wireless autonomous tape agents as peripheral wireless autonomous tape agents; and switching, by the master wireless autonomous tape agent, the peripheral wireless autonomous tape agents into a low-power mode.

12. The method of claim 11, further comprising, by the server, waking a selected one of the peripheral wireless autonomous tape agents from the low-power mode and designating the selected peripheral wireless autonomous tape agent as a current master wireless autonomous tape agent.

13. The method of claim 12, further comprising, by the server, configuring the selected peripheral wireless autonomous tape agent with coded instructions to operate as a master wireless autonomous tape agent.

14. The method of claim 11, further comprising, by the master wireless autonomous tape agent, waking the peripheral wireless autonomous tape agents according to a wake schedule, detecting an unscheduled relative motion between the master wireless autonomous tape agent, and transmitting an alert based on detection of the unscheduled relative motion between the master wireless autonomous tape agent and any of the peripheral wireless autonomous tape agents above a threshold.

15. The method of claim 1, further comprising receiving, by a selected one of the wireless autonomous tape agents, global scheduling description language instructions defining an event, defining a response to the event, and performing the defined response based on detection of the event.

16. A system to schedule communications for wireless autonomous tape agents in a hierarchy of levels, comprising:

wireless autonomous tape agents operative to synchronize with respect to a timing reference;

a server operative to propagate scheduling instructions in a global scheduling description language to the wireless autonomous tape agents in the hierarchy of levels, wherein the server is operative to perform operations comprising transmitting a respective subset of the global scheduling description language instructions in a preceding level in the hierarchy to each wireless autonomous tape agent in a successive level lower in the hierarchy, and repeating the transmitting for each successive level lower in the hierarchy; and the wireless autonomous tape agents are operative to execute the respective instructions to create a monitoring network for packages.

17. The system of claim 16, wherein the server is operative to restrict the propagation of global scheduling description language from a preceding level in the hierarchy to a successive lower level in the hierarchy to a subset of the global scheduling description language that is relevant to the wireless autonomous tape agents in the successive lower levels in the hierarchy.

18. A computer program product for execution by a computer system and comprising at least one non-transitory computer-readable medium having computer-readable program code portions embodied therein, the computer-readable program code portions comprising:

an executable code portion to synchronize wireless autonomous tape agents with respect to a timing reference;

an executable code portion to propagate, by a server, scheduling instructions in a global scheduling description language to the wireless autonomous tape agents in a hierarchy of levels, wherein the executable code portion to propagate comprises an executable code portion to transmit a respective subset of the global scheduling description language instructions in a preceding level in the hierarchy to each wireless autonomous tape agent in a successive level lower in the hierarchy, and repeating the transmitting for each successive level lower in the hierarchy; and an executable code portion to execute, by the wireless autonomous tape agents, the respective instructions to create a monitoring network for packages.

Additional Embodiment 2—Bridging Autonomous Wireless Tape Agent Communications

1. A system for establishing a wireless communications connection between autonomous wireless tape agents and a remote server, comprising:

autonomous wireless tape agents adhered to stationary infrastructure and mobile assets within a physical premises environment;

a mobile vehicle carrying a wireless gateway comprising a first wireless communications interface to communicate with the remote server, and a second wireless communications interface to communicate with the autonomous wireless tape agents in the physical premises environment, wherein the second communications interface is operable to transmit one or more wakeup signals to wake the autonomous wireless tape agents in the physical premises environment, and the second communications interface is further operable to scan wireless signals transmitted by the autonomous wireless tape agents in the physical premises environment.

2. The system of claim 1, wherein the second communications interface is operable to transmit one or more wakeup signals to wake the autonomous wireless tape agents in the physical premises environment from a low-power mode of operation to a normal power mode of operation.

3. The system of claim 1, wherein the second communications interface is operable to transmit wakeup signals concurrently.

4. The system of claim 1, wherein the second communications interface is operable to transmit wakeup signals serially.

5. The system of claim 1, wherein the second communications interface is a single channel serial interface.

6. The system of claim 5, wherein autonomous wireless tape agents download respective non-interfering schedules of times to transmit data to the wireless gateway over the second communications interface.

7. The system of claim 1, wherein the wakeup signal concurrently wakes multiple of the autonomous wireless tape agents, and each autonomous wireless tape agent is configured to wait a random amount of time before transmitting data on the second communications interface.

8. The system of claim 1, wherein at least one of the autonomous wireless tape agents comprises a low-power radio that is awake while a primary radio remains off until it is awakened by the receipt of a wakeup packet by the low-power radio.

9. The system of claim 1, further comprising a stationary antenna associated with a serial communications interface in the physical premises environment, wherein the serial communications interface is operable to record serial communications interface data received from the autonomous wireless tape agents.

10. The system of claim 9, wherein the serial communications interface is operable to transmit the logged serial communications data to the second communications interface of the wireless gateway when the mobile vehicle is within range of the stationary antenna.

11. The system of claim 10, wherein the serial communications interface is a LoRaWAN interface.

12. A method of establishing a wireless communications connection between autonomous wireless tape agents and a remote server, comprising:
adhering autonomous wireless tape agents to stationary infrastructure and mobile assets within a physical premises environment;
carrying, by a mobile vehicle, a wireless gateway comprising a first wireless communications interface to communicate with the remote server;
by a second wireless communications interface, communicating with the autonomous wireless tape agents in the physical premises environment;
transmitting, by the second communications interface, one or more wakeup signals to wake the autonomous wireless tape agents in the physical premises environment; and
scanning, by the second communications interface, wireless signals transmitted by the autonomous wireless tape agents in the physical premises environment.

13. A system for establishing a wireless communications connection between autonomous wireless tape agents and a remote server, comprising:
autonomous wireless tape agents adhered to stationary infrastructure and mobile assets within a physical premises environment;
a mobile vehicle associated with a wireless gateway comprising
by a first wireless communications interface, an executable code portion to communicate with the remote server;
by a second wireless communications interface, an executable code portion to communicate with the autonomous wireless tape agents in the physical premises environment;
an executable code portion to transmit, by the second communications interface, one or more wakeup signals to wake the autonomous wireless tape agents in the physical premises environment; and
an executable code portion to scan, by the second communications interface, wireless signals transmitted by the autonomous wireless tape agents in the physical premises environment.

Additional Embodiment 3—Programmable Network Nodes

1. A method of creating a hierarchical communications network, comprising:
adhering a first tape node to a first parcel in a set of associated parcels, the first tape node including a first type of wireless communication interface and a second type of wireless communication interface having a longer range than the first type of wireless communication interface;
adhering a second tape node to a second parcel in the set, the second tape node including the first type of wireless communication interface, wherein the second tape node is operable to communicate with the first tape node over a wireless communication connection established between the first type of wireless communication interfaces of the first and second tape nodes; and
establishing, by a server system executing an application, a wireless communication connection with the second type of wireless communication interface of the first tape node, and transmitting, by the application, programmatic code executable by the first tape node to function as a master tape node with respect to the second tape node.

2. The method of claim 1, further comprising, by the server system: instructing the first and second tape nodes to report their current respective battery levels; and determining whether to designate the second tape node as a master tape node of the first tape node based on the reported current respective battery levels.

3. The method of claim 2, further comprising, by the server system, designating the second tape node as the master tape node based on a determination that the current battery level of the first tape node is below a threshold battery level.

4. The method of claim 2, further comprising, by the server system, designating the second tape node as the master tape node based on a determination that the current battery level of the second tape node is higher than the current battery level of the first tape node.

5. The method of claim 1, further comprising, by the server system, transmitting programmatic code executable by the second tape node to detect and respond to an event.

6. The method of claim 5, wherein, based on execution of the programmatic code by the second tape node, performing operations comprising transmitting a wireless communication to an address of a third tape node adhered to an associated parcel in the set, and alerting the server system based on a failure of the second tape node to receive a responsive communication from the third tape node.

7. The method of claim 6, wherein the alerting comprises, by the second tape node, transmitting an alarm packet to the master tape node for transmission to the server system.

8. The method of claim 1, further comprising designating, by the server system, the first tape node as a master tape node with respect to a third tape node adhered to an associated parcel in the set.

9. The method of claim 8, wherein each of the second and third tape nodes comprises a respective sensor; and further comprising, by the second and third tape nodes, respectively collecting local parcel condition data and processing the collected local parcel condition data to produce respective processed parcel condition data sets.

10. The method of claim 9, wherein each of the respective processed parcel condition data sets comprises data values of a respective histogram.

11. The method of claim 9, further comprising, by the second and third tape nodes, transmitting the respective processed parcel condition data sets to the designated master tape node; and further comprising, by the designated master tape node, processing the processed parcel condition data sets to produce a combined processed data set.

12. The method of claim 11, wherein the combined processed parcel condition data sets comprises data values of a respective histogram.

13. A hierarchical communications network, comprising:
a first tape node adhered to a first parcel in a set of associated parcels, the first tape node including a first type of wireless communication interface and a second type of wireless communication interface having a longer range than the first type of wireless communication interface;
a second tape node adhered to a second parcel in the set, the second tape node including the first type of wireless communication interface, wherein the second tape node is operable to communicate with the first tape node over a wireless communication connection established between the first type of wireless communication interfaces of the first and second tape nodes; and
a server system operable to execute an application to perform operations comprising establishing a wireless communication connection with the second type of wireless communication interface of the first tape node, and designating, by the application, the first tape node as a master tape node with respect to the second tape node.

14. A method of creating a hierarchical communications network, comprising:
activating a first tape node and adhering it to a first parcel in a set of associated parcels, the first tape node comprising a first type of wireless communication interface and a second type of wireless communication interface having a longer range than the first type of wireless communication interface;
activating second and third tape nodes and respectively adhering them to second and third parcels in the set of associated parcels, the second and third tape nodes each comprising the first type of wireless communication interface and a respective sensor, wherein each of the second and third tape nodes is operable to communicate with the first tape node over a wireless communication connection established between the first type of wireless communication interfaces of the first, second, and third tape nodes;
by a server system executing an application, transmitting to each of the second and third tape node programmatic code for detecting and responding to an event.

15. The method of claim 14, wherein, based on the programmatic code, the second tape node performs operations comprising transmitting a wireless communication to an address of the third tape node, and alerting the server system based on a failure of the second tape node to receive a responsive communication from the third tape node.

16. The method of claim 15, wherein the alerting comprises, by the second tape node, transmitting an alarm packet to the master tape node for transmission to the server system.

17. The method of claim 14, further comprising transmitting, by the server system, programmatic code instructing the second and third tape nodes to perform operations comprising using their respective sensors to collect local parcel condition data and processing the collected local parcel condition data to produce respective processed parcel condition data sets.

18. The method of claim 17, further comprising transmitting, by the server system, programmatic code enabling the first tape node to perform operations comprising functioning as a master tape node of the second and third tape nodes, and processing the processed parcel condition data sets to produce combined processed parcel condition data set.

19. The method of claim 18, wherein the aggregated processed parcel condition data sets comprise data values of a respective histogram.

Additional Embodiment 4—Infrastructure for Autonomous Intelligent Tape Agents

Low cost locationing/gateway infrastructure for connecting tape to cloud.

Mobile trucker hub. Mobile vehicle/unit equipped with wireless gateway for communicating with tape agents. Connects tape agents with cloud when mobile unit visit a product/materials storage facility (e.g., customs, shipping ports, warehouses, factories). Measure mobile and/or stationary tags. Tag is the master (not the infrastructure; tag looks for slave that can communicate for it).

Mobile client of human operator. Operator device running Trackonomy application. Application can run in background to connect any nearby tape to cloud. Other functions: associate tape with phone; picture of package; agreement on unique identifier transmitted to the cloud; bill of lading—digital interpretation of the bill of lading; verification procedure for packages (e.g., unknown boxes). Secure log in.

User experience flow for activation and verification termination. Show what the app would look like. Hold phone. Based on RSSI know proximity. Asks you to make a photo of the bill of lading. OCR to input the digitally QR code. Termination—gone out of system; success, not success; manual inspection; photo of what was received; signature.

Other infrastructure options: Install antenna on roof of storage facility; Dedicated gateways.

Tape agent implemented infrastructure functionality. Tape agent as gateway for master tape agents. Tape agents as locationing beacons. Installed throughout facility (e.g., multi-level warehouse, every level).

Tape agents for tracking state of facilities and mobile entities (e.g., forklift, doors, shipping container, gatekeeper for faraday cage, secure rooms, smart manufacturing)

Hierarchy of tape agents. Example—there is separate tape on pallet cluster, and each package in the cluster has its own tape. Hierarchy of traffic agents. If fully under control of cluster, can turn off tapes on individual packages only need to determine when the tapes are not longer part of the cluster anymore by pallet tape, which only needs to determine when box is not part of cluster; one master. Clusters talk to one another for the purpose of determining splits and consolidations, not for tracking. Topmost protocol is master/slave. Master could be changing; adaptive protocol, if figure out all tapes are together, only need one tape on at a time where the master can switch from one tape to another; if master detects something, use shock sensor to turn on accelerometer to see if something is moving.

Additional Embodiment 5—Dynamic Network of Autonomous Intelligent Tape Agents

Networking using LORA. Serial network. All gets logged, but cannot read it out whenever you want; in order to send/receive data need to wait until in environment that enables connection to cloud. Tape agent on package is master, package says I'm in region of stationary antenna, tape specifies what operations to perform; tape agent on package controls flow of information. Tape agent activation procedure: turn-on tape agent; cut tape sensor. Protocol to align timing/synchronize clocks of tape agents. Tape agents download schedule and configuration parameters for performing operations. Associate tape agents with centralized system. Schedule when tape agent turns on: when turn on reset time with cloud; misalignment skew (few seconds); how long to keep on to get alignment; agree on next time to communicate, align potential skew; have it on a long time vs. turn on for shorter time more frequently; put information in beacon. Schedule has constructs (e.g., when to wake up, how often to wake up, schedule for waking up, trigger points for waking, tape reports identity).

Alternatively, have a scanner that detects presence of gateway. No communication unless reader available to read. When reader says read, wake-up radio. Wake up app, wakeup all tapes within vicinity. Solve problem of having to coordinate turn on of all devices. Avoids issues of skew and turning on fixed schedule which risks wasting battery life.

Tape agent wakeup upon receipt of RF frequencies. Security feature; secure way to wake up; complete security check before sending out any information. The tape is in control, figures out when it's near hub geo-fences, and then starts mass transmit.

Additional Embodiment 6—Preventative Logistics

Configuration Environment in which you can map out your supply chain and partners, and drag and drop boxes and pallets; once you have that description, the system compiles and splits out codes to all the different tapes; delegates overall objective to all the individual traffic agents either at package-level or pallet-level or container-level.

Tape agents act as traffic agents that detect violations, then go into very deep sleep mode. Localized context-sensitive checks.

Download checks/violations for triggering alarms. Supply chain rules. API for all things that can go wrong (e.g., dropped package, outside temperature range, incorrect splits). Implied notion—measuring progress against the plan; knowledge of plan.

Tapes log everything (e.g., capture splits and consolidations). Example violations: boxes that need to be together. We have an encoding system that tells you which tape agents are allowed to be in your cluster. When associate an ID to the tape, you can have indications of who can be your associate. Looking at other packages, when removed when shouldn't be moved (alarm). Acceleration about threshold (dropped), stop shipment; "traffic agents" inside packages signal environment not to ship.

Detecting splits and consolidations. Mobile and stationary devices still form a network. Truck has list of things it should have as truck is being loaded (e.g., detect when item not on list is loaded and detect when item supposed to have is missing). Look at drop in RSSI and look at accelerometers not fully aligned any more. If packages on same pallet, should have same acceleration profile; if not, lost one or more. Also should have same RSSI signal strength, if drop in RSSI might have lost one. Algorithm: for loading/unloading, look at RSSI; see drop in strength in one or more tapes.

Continuous intelligence: protect box; prevent wrong splits/consolidations; prevent wrong loading/unloading; Need to know the logistics plan.

Box specific violations downloaded (instead of constantly checking). Can download parts of the plan. E.g., allowed to split/merge within these parameters. Checks: make sure pallet owned by you; if your pallet, these are the ones going to particular geography, shocks, drops.

Smart pallets. Not pallet itself because it is swapped out multiple times during shipment; focus on collection of boxes as unit, not pallet.

Alarm—box starts buzzing the moment you split or consolidate it in a cluster that is in violation with the overall shipment plan (or you get a text message telling you what to do).

Additional Embodiment 7—Consumable RFID Reader

Master tape agent configured to poll nearby tape agents configured with active RFID tags that are powered by external power source (e.g., RF hub). Master tape agent logs inventory. Master tape detects protocol violations.

Additional Embodiment 8—Scheduling

Container with cellphone: Cellphone-to-LORA+LORA-to-BLE+BLE-to-RFID

This whole hierarchy reduces cost. Optimize for hierarchical packaging (ship-container-pallet-box). Want to track lowest abstraction level. Minimize cost from BOM and monthly service costs. Multi-radio system.

Network protocol, scheduling (battery powered; need to turn-on/off), runtime operating system. Some communicators only communicate in one direction or only in broadcast mode.

CELL-LORA+LORA-

Broadcast mode LORA talks to all boxes, alternatively direct communication to a particular box. LORA single channel. Broadcast to all→protocol: each node waits an arbitrary amount of time before transmitting/receiving signal; heartbeat: once per hour check-in. Two approaches—scheduling description language—before do rollout, have a description of all the communication events that will be scheduled distributed across network; each node only sees what its responsible for. E.g., master tape for container, master tape for pallet, etc. BLEs are slaves. Each master will receive the GSDL portion that it is scoped for.

E.g., rule in global scheduling description language that say these two boxes need to stay together. They need to go to same destination. GSDL says that every five minutes or 1 hour check to make sure that the box is still there. Part of GSDL need to roll up all the statistics. This pallet collects the statistics of the details of its functioning—e.g., how often are there shocks, histogram of different locations, vs. how often there were shocks greater than threshold across particular region. As you go up the grouping hierarchy, the data is merged with the data for the other groups at the same level. Do analytics in the cloud and at the distributed level. If only do it in cloud, we're only pure cloud players; if want to monetize fact that we can do software and hardware, we need to find value in doing analytics locally. Very battery constrained, limits ability to do everything in cloud: do everything at box level (communicate, e.g., histograms), combine box level to generate analytics at the pallet level, combine box level data to generate analytics at the container level, etc. to the cloud. Different brokers: A, B, C, . . . . F; how often temp violation happens, shock, splits, wrong consolidations, wrong loading/unloading.

All information has to bubble up to the cloud. Everyone cannot start communicating at the same time.

In the past GPS trackers do this with 3 million boxes and 500,000 pallets. Need dashboards and visualizations that fit the data measures. Made HW dirt-cheap. Software irrelevant. New state: truck contains packages, has a trucker hub, and communicates through LORA.

Hierarchy of communication is non-trivial. Instead of having cellular everywhere (too expensive), we need different layers.

Example: RFID→Bluetooth→LORA→cellular

Practical setup: how do I communicate with what, at what point in time; how do we schedule; break it down with graph notation (arrow is direction of communication vs. broadcast mode); axes are communication events, the nodes are objects with sensor nodes (can be on a pallet, container, truck, forklift, door, light switch). Some nodes can only communicate in broadcast mode (e.g., LORA). Arrow represents direction of communication (use edge to indicate not a broadcast mode).

Need for different analytics—what that means when communicate it up is do analytics locally and then consolidate it as you move up the hierarchy. Pallet is smart enough to combine the histograms of the multiple boxes. Container smart enough to combine multiple pallets to generate analytics, etc.

Communication is very expensive. Need scheduling. Global scheduling description language—for all the nodes we specify what needs to happen at what point in time. Assume world is static: can say I want these two boxes on this pallet to check every two days to make sure the other box is still there; unless there is an acceleration event across an acceleration threshold (accelerometer) in which someone tries to move it then want to check up on acceleration threshold event. Not a program, this is a generic description language that has instructions (e.g., go communicate X on this trigger Y). Trigger can be every hour based on time frequency, based on temperature; thresholds can be based on GPS locations, lots of different triggers. Do not know a priori that someone is going to move the box, but can assume for this static scenario that pallet will always be in this container.

Will not send the entire description language to every node. Instead, will only send the respective portion of the description language that pertains to each particular node. Every container knows the elements/nodes of which it is the master; and only communicates lower in the hierarchy the scheduling description language that is relevant to that portion of the hierarchy. Only description language that gets transmitted by a particular master node is the portion relevant to the slaves below it.

Example: trucker hub can communicate with tapes on boxes. As soon as trucker hub comes by, need to wake them up if want to scan what's going on. Triggers: location, acceleration, temperature, or wakeup signal (another am wave that hits the tape). Can be a scheduled event. Global Scheduling Description Language (e.g., between 1 and 4 pm, ping every thirty minutes because we know truck is going to be there during that time.

The other approach: TCP IP—all the different nodes have a forwarding table that knows how to address things to certain areas. The graph (including dotted ones) is stored in every node—acts like a router. Give an instruction to this box (which has an address) you give it an instruction to measure temperature; forwarding table says this box is on this pallet, this box receives it, does its thing, sends packets back. Every node has a bunch of services that it offers to the overall system, and one service is just a communication service. Someone sends me packets, I don't know that the contents are, I don't care; I will just forward the packets along path to the destination. Eventually received by point in the hierarchy that knows what to do with the packet and processes it. Need to store forwarding table everywhere.

Hybrid: generic description language—forward to relevant nodes, distributed analytics; TCPIP more robust. Three layers: (1) physical embodiment—HW pieces that communicate with one another; (2) firmware—operating system, how communication events really happen in way that minimizes power; (3) given supply chain, where do I put my nodes (supply chain with factory here, have a truck, a boat, test something here and it goes back—flow of parts—put node here to figure out if door is open or closed; put node on truck to figure out where it is, put one on pallet, put one on board, etc.

You can put cellular radio tape on truck, but put lower cost tape on box. Hierarchy of communication must match physical hierarchy of logistics. Consideration: how many units are covered, how expensive are the units, what infrastructure pieces do the units see. Solving that problem—whole new user interface environment; drag and drop box; model logistics problem, then press button, thing rolls out—optimize where you go; modeling and then deployment; app on phone: operators (not trained) instructed by app to place green tape on this wall; also consider maintenance—check if tape still has power or replace.

Levels: model supply chain; figure out optimum partitioning; rollout of having services at different places; firmware of making the whole thing tick. Optimize that diagram based on your supply chain requirements; and optimize cost of tapes based on actual products being protected; not just colors, it is also statistical weighting factor (e.g., every tape has tracker/sensor, or sampling tape). Where do I put the nodes; what color are the nodes; what sampling rate/strength is it (1 out of 10 or 1 out of 5); what battery life, range of communication.

On top of this is sampling rate (e.g., want to sample this node every hour)—dictates amount of battery; range of Trackonomy products, what color do I grab (10% sampling or 100% sampling).

Power harvesting (e.g., solar cells). Mechanism for harvesting (solar cells, vibrations, etc.); scheduling transmission of measurement. Measurement one time; one-time read. Part of scheduling framework. One-time read tags. Use models. Sampling rates; E&M harvesting for sensors.

Hierarchy of communication types; what does hierarchy mean in terms of network protocol, the scheduling, the runtime operating system, heartbeats of measuring; let's say cellular is expensive link, maybe heartbeat of every hour to send something; if I'm a box I need to be aware of that; if I want to send something to the cloud, I am the master of the universe, I know there is a service that is available to help transmit data to the cloud; I know that a signal will be available to receive my transmission in one hour; window to transmitting data is limited. Not just hierarchy; BLE tags all communicate with each other, some may see each other, others might not see others.

Graphical notation makes things simpler; how communications should flow; generic clauses: two ends of spectrum—either scheduling description language vs. TCP IP (need forwarding tables, all nodes need to know whole network); we have a very dynamic system (e.g., truck driving by warehouse to scan boxes at certain times; we will know the schedules). TCP IP is too generic, does not leverage what we know. Check container once per day; check pallet once per hour; . . . .

Scheduling description language: communicate every two hours; give that instruction to my container; another scheduling instruction: synchronize clocks/reset clocks (local area—e.g., Oakland port).

Inherent hierarchy; every node needs to decide what is affected by the lower abstraction levels; we know some schedules, also need some notion of forwarding where the pallet know which boxes it is the master of. Pallet can say these are my boxes; container can say these are my pallets.

TCPIP addressing scheme: {box}, {pallet}, {container}, {mobile (truck, ship, airplane)}, {stationary network}, {dynamic network—e.g., truck that drives by on schedule or arbitrary}). Really should say {type of thing, ID}. THING (type of thing, ID). Thing: box, forklift, light switch, etc. Post duct tape on thing want to monitor. Dynamic IP address (move box to another pallet). On top of this, this world is more scheduled than internet; scheduling description language.

Send measurement if triggered (GPS, shock, temperature, time (duration, frequency,) Measurement can be GPS, temperature, other boxes detected.

Send scheduling description language (SDL) to slave nodes; send measurement of thing (send me temperature of box 156 if GPS is near the harbor). Send SDL, box 536 is in this container in this port, so all the slaves that are affected by this keep it in your memory, hierarchical recursive propagation, master of a bunch of subordinate slaves. Who is affected by this particular thing ID, this box says.

Another instruction: create histogram of certain measurement of a thing which is triggered; call instruction multiple times; locally stored.

Type: door, box, forklift, light switch (whatever needs to be measured/detected)

When receive overall address of a "thing" also know dynamic IP address—e.g., move box to a different pallet, address changes.

Put duct tape at location of strategic event. TCPIP thinking, when I get overall address of a thing, I also know what pallet I'm addressing.

Scheduling description language: send measurement if triggered (GPS, shock, temperature, time (duration, frequency), other boxes detected.

Another instruction: send scheduling description language to slave, e.g., send measurement of thing (temperature of box 1567 if within x GPS coordinates of port y). Send SDL: box 1567 is in this container, at this port, so all slaves that are affected by this keep it in your memory. Hierarchical recursive propagation. I'm master of other slaves; who's affected by this particular ID? These boxes are mine.

Another instruction: create a histogram of certain measurement of a thing; instead of a single measurement, call for transmission of measurement from multiple slave nodes. Aggregate data. Send analytical results.

Implementation: control block with memory, analytics (e.g., histogram); sensors to do measurements; trigger logic to interpret things; storage (sensor data, SDL, forwarding table/graph—each node needs to know its slaves in order to play a role in the operation of the system.

TCP IP (forwarding table) logic that knows how to communicate with the slaves and other nodes; SDL tell controller to do analysis of all the sensors that are slaves of it; e.g., do analysis of all temperature over period, measure every hour, show me histogram as a function of location; it knows all the slaves, and send instruction, break it up and send to all the boxes and then consolidate the result. generic description of a thing and its address; want to communicate with box 123, pallet 5 on container 2 it is connected to ship 1 and not opportunistic links. If I'm at a node and want to do something with box 123, I know pallet 5 is connected to me, send instruction to pallet 5, which will then talk with box 123. If don't have access to pallet 5, then will go to container 2, if that doesn't work go to ship 1, which will then go to container 2, pallet 5, then box 123. Then box 123 executes that instruction and communicates the results all the way up.

Scheduling description language: example instructions; send certain measurement (GPS, temp, other boxes detected in area) of a certain thing that has a unique ID at a certain trigger point; trigger can be GPS coordinates, certain distribution area, can be shock, time (duration, frequency); go one level up, store a histogram of all these measurements; of a certain thing and trigger; execution logic will understand that it needs to take measurement multiple times and aggregate. Store histogram. Another instruction: send stored histogram up the network. Execute to combine histograms, also need to send the data on which the histogram is based in order to combine the multiple histograms. Need to look at all analytics people want to do, histograms is just one. Break it down locally so don't have to communicate everything upward (e.g., include number of data points, high, low values (range), etc.). Consider sampling to determine analytics.

One instruction is <send>, is <do>, <store>. Sending is expensive. Instruction set: store measurement every hour; send once per day or when in port with low cost way of obtaining measurement data (e.g., at warehouse).

This system is applicable to all applications. Sampling on cellular (10%—1 out of 10 cones have communications; heartbeat every 30 minutes), rest are Bluetooth. Tell me how many cars pass by detector once per day (continuous monitoring). General description language to control how system operates, need modeling environment to create this. Need generic description to capture requirements, click on a button to cause the system to generate the program code (scheduling description language). Every node will need to have a unique identifier. Smart building. Measuring events. Intersection of smart world with people doing activities. People open doors etc. Perform optimization of those activities. People enter, leave, turn on computer, turn on lights. When car is parked/leaves, when box enters certain section, when boxes see other boxes.

Other embodiments are within the scope of the claims.

The invention claimed is:

1. A method, comprising:
   providing a first tape node of a hierarchical communications network including a first type of wireless communication system having a first range;
   providing a second tape node of the hierarchical communications network including the first type of wireless communication system and a second type of wireless communication system having a second range longer than the first range, wherein the second tape node is designated as a master node and the first tape node is designated as a slave node to the second tape node in the hierarchical communications network;
   monitoring a battery level of the second tape node; and
   changing, based on the monitored battery level, the master node designation of the second tape node.

2. The method of claim 1, further comprising changing the designation of the first tape node to a master node in the hierarchical communications network.

3. The method of claim 2, wherein the designation of the second tape node is changed to a slave node of the first tape node, based on the monitored battery level.

4. The method of claim 1, further comprising:
receiving a battery level of the first tape node; and
changing the designation of the first tape node to a master node in the hierarchical communications network, in response to the received battery level of the first tape node being above or equal to a threshold.

5. The method of claim 1, wherein the first tape node does not include the second type of wireless communication system.

6. The method of claim 1, further comprising:
designating a third tape node of the hierarchical communications network as a master tape node, and
changing the designation of the first tape node to be a slave node of the third tape node.

7. The method of claim 6, wherein the third tape node comprises the first type of wireless communication system.

8. The method of claim 6, wherein the third tape node comprises the second type of wireless communication.

9. The method of claim 1, wherein the second tape node further comprises a third type of wireless communication system having a third range longer than the second range.

10. The method of claim 9, wherein the third type of wireless communication system comprises a cellular communication system or a geolocation satellite system.

11. The method of claim 1, wherein the first type of wireless communication system comprises one or more of a Bluetooth communication system, WiFi communication system, a z-wave communication system, an RFID communication system, and a ZigBee communication system.

12. The method of claim 1, wherein the second type of wireless communication system comprises one or more of a LoRa communication system, a LoRaWAN communication interface, cellular communication system, and an RF communication system.

13. The method of claim 1, wherein the designation of the second tape node is changed in response to the received battery level being below or equal to a threshold level.

14. A method, comprising:
providing a first tape node of a hierarchical communications network including a first type of wireless communication interface having a first range and a second type of wireless communication interface having a second range greater than the first range;
providing a second tape node of the hierarchical communications network including the first type of wireless communication interface
receiving a battery level of the first tape node;
receiving a battery level of the second tape node;
designating, based on the received battery level of the first tape node and on the received battery level of the second tape node, the second tape node as a master node in the hierarchical communications network.

15. The method of claim 14, wherein the received battery level of the first tape node is below a threshold level.

16. The method of claim 14, wherein the received battery level of the second tape node is above a threshold level.

17. A system comprising:
a hierarchical communications network comprising:
a first tape node comprising a first type of wireless communication interface having a first range and a battery, the first tape node initially designated as a slave node in the hierarchical communications network;
a second tape node comprising the first type of wireless communication interface and a second type of wireless communication interface having a second range longer than the first range and the second tape node configured to report a current energy storage level of the battery to another wireless node of the hierarchical communications network, wherein the second tape node is initially designated as a master node of the first tape node in the hierarchical communications network; and
a network service application configured to:
receive a level of energy stored on a battery of the second tape node, and
change the designation of the second tape node as a master node in the hierarchical communications network.

18. The system of 17, wherein the network service application is further configured to change the designation of the first tape node as a slave node.

19. The system of 18, wherein the designation of the first tape node is changed to a master node in the hierarchical communication network.

20. The system of 19, wherein the second tape node receives the a level of energy stored on a battery of the first tape node and reports the received current energy storage level to the network service application using the second type of wireless communication interface.

* * * * *